US012140369B2

(12) United States Patent
Oh et al.

(10) Patent No.: US 12,140,369 B2

**(45) Date of Patent: *Nov. 12, 2024**

(54) MULTI-JOINT LINK HINGE AND REFRIGERATOR INCLUDING THE SAME

(71) Applicants: LG Electronics Inc., Seoul (KR); EPTech Co., Ltd., Gyeonggi-do (KR)

(72) Inventors: Changseok Oh, Seoul (KR); Chunho Byun, Seoul (KR)

(73) Assignees: LG Electronics Inc., Seoul (KR); EPTech Co., Ltd., Gyeonggi-do (KR)

( * ) Notice: Subject to any disclaimer, the term of this patent is extended or adjusted under 35 U.S.C. 154(b) by 364 days.

This patent is subject to a terminal disclaimer.

(21) Appl. No.: 17/324,470

(22) Filed: May 19, 2021

(65) Prior Publication Data

US 2021/0364224 A1 Nov. 25, 2021

(30) Foreign Application Priority Data

May 19, 2020 (KR) ........................ 10-2020-0059986
Jul. 30, 2020 (KR) ........................ 10-2020-0095442
Aug. 12, 2020 (KR) ........................ 10-2020-0101417

(51) Int. Cl.

*F25D 23/02* (2006.01)
*E05D 3/16* (2006.01)
*E05D 11/04* (2006.01)

(52) U.S. Cl.

CPC ............ *F25D 23/028* (2013.01); *E05D 3/16* (2013.01); *E05D 11/04* (2013.01); (Continued)

(58) Field of Classification Search

CPC ............ F25D 2323/024; F25D 23/028; E05Y 2900/31; E05D 3/06-16; E05D 2003/166; (Continued)

(56) References Cited

U.S. PATENT DOCUMENTS 2,674,761 A * 4/1954 Weiss ........................ E05D 3/16 16/374
5,497,534 A * 3/1996 Caruso ...................... E05F 1/14 16/370

(Continued)

FOREIGN PATENT DOCUMENTS

CN 101111655 1/2008
CN 201050256 4/2008

(Continued)

OTHER PUBLICATIONS

Extended European Search Report in European Appln. No. 21174248.1, dated Jan. 31, 2022, 13 pages.

(Continued)

*Primary Examiner* — Andrew Roersma

(74) *Attorney, Agent, or Firm* — Fish & Richardson P.C.

(57) ABSTRACT

A multi-joint link hinge includes a hinge bracket, a plurality of side portions, a link module, and a door bracket coupled to the link module. The hinge bracket includes a base portion that defines a plurality of screw coupling holes at a vertical surface of the base portion, and a plurality of side portions that extend from the base portion in a horizontal direction and are spaced apart from each other in a vertical direction. The link module includes a plurality of links that are coupled to the plurality of side portions along an axis that extends in the vertical direction, where the plurality of links is disposed between the plurality of side portions.

14 Claims, 29 Drawing Sheets

(52) U.S. Cl.
CPC ..... *E05D 2003/166* (2013.01); *E05Y 2600/51* (2013.01); *E05Y 2900/31* (2013.01); *F25D 2323/024* (2013.01)

(58) Field of Classification Search
CPC ........ E05D 2005/102; E05D 2005/106; E05D 5/14; E05D 11/04
USPC ............................................................ 16/247
See application file for complete search history.

(56) References Cited

U.S. PATENT DOCUMENTS

| | | | | |
|---|---|---|---|---|
| 7,197,790 | B1 * | 4/2007 | Edmondson | E05F 1/1292 16/370 |
| 7,987,558 | B2 | 8/2011 | Beckmann et al. | |
| 8,807,673 | B2 | 8/2014 | Benigni | |
| 8,844,097 | B2 * | 9/2014 | Bonomie | H01H 9/00 16/374 |
| 10,876,335 | B2 | 12/2020 | Byun | |
| 11,459,810 | B1 * | 10/2022 | Smith | F25D 23/028 |
| 11,661,781 | B2 * | 5/2023 | Kikuchi | E05F 1/1207 16/221 |
| 2002/0166208 | A1 | 11/2002 | Kondo | |
| 2005/0251962 | A1 * | 11/2005 | De Mello | F25D 23/028 16/262 |
| 2010/0101052 | A1 | 4/2010 | Waltemate et al. | |
| 2010/0125970 | A1 | 5/2010 | Leimkuehler et al. | |
| 2010/0127514 | A1 * | 5/2010 | Nilsson | E05D 11/105 292/285 |
| 2013/0219797 | A1 * | 8/2013 | Bonomie | E05D 7/0423 16/382 |
| 2014/0201948 | A1 | 7/2014 | Dubach | |
| 2015/0059126 | A1 | 3/2015 | Dubina et al. | |
| 2016/0245579 | A1 | 8/2016 | Eom et al. | |
| 2017/0045287 | A1 | 2/2017 | Liu et al. | |
| 2017/0108266 | A1 | 4/2017 | Kim et al. | |
| 2018/0283077 | A1 | 10/2018 | Lee et al. | |
| 2019/0101320 | A1 | 4/2019 | Dherde et al. | |
| 2019/0368247 | A1 * | 12/2019 | Carbone | E05D 11/00 |
| 2020/0208450 | A1 | 7/2020 | Ferreira et al. | |
| 2021/0148628 | A1 * | 5/2021 | Lottinville | F25D 23/085 |
| 2021/0238902 | A1 | 8/2021 | Byun et al. | |
| 2021/0364223 | A1 * | 11/2021 | Oh | E05F 5/02 |
| 2022/0018591 | A1 * | 1/2022 | Kikuchi | F25D 23/10 |

FOREIGN PATENT DOCUMENTS

| | | | | |
|---|---|---|---|---|
| CN | 101663451 | | 3/2010 | |
| CN | 105637307 | | 6/2016 | |
| CN | 105910372 | | 8/2016 | |
| CN | 108278841 | A * | 7/2018 | F25D 23/028 |
| CN | 208605065 | | 3/2019 | |
| CN | 110374436 | | 10/2019 | |
| CN | 210239421 | | 4/2020 | |
| DE | 10239599 | A1 * | 4/2003 | E05D 1/04 |
| EP | 0565900 | A1 * | 10/1993 | E05D 3/04 |
| EP | 2754982 | | 7/2014 | |
| KR | 101497295 | | 3/2015 | |
| KR | 1020160099982 | | 8/2016 | |
| WO | WO-2008050975 | A1 * | 5/2008 | F25D 23/028 |
| WO | WO2014154252 | | 10/2014 | |
| WO | WO2019117236 | | 6/2019 | |

OTHER PUBLICATIONS

Extended European Search Report in European Appln. No. 21173946.1, dated Oct. 18, 2021, 7 pages.
Office Action in Chinese Appln. No. 202110516216.3, dated Jul. 22, 2022, 15 pages (with English translation).
Partial European Search Report in European Appln. No. 21174248.1, dated Oct. 18, 2021, 14 pages.

* cited by examiner

MULTI-JOINT LINK HINGE AND REFRIGERATOR INCLUDING THE SAME

CROSS-REFERENCE TO RELATED APPLICATIONS

The present application claims priority under 35 U.S.C. 119 and 35 U.S.C. 365 to Korean Patent Application Nos. 10-2020-0059986, filed on May 19, 2020, 10-2020-0095442, filed on Jul. 30, 2020, and 10-2020-0101417, filed on Aug. 12, 2020, the disclosures of which are hereby incorporated by reference in their entirety.

TECHNICAL FIELD

The present disclosure relates to a multi-joint link hinge and a refrigerator including the same.

BACKGROUND

Refrigerators are home appliances for storing food at a low temperature in an inner storage space covered by a refrigerator door. For example, the inside of the storage space may be cooled by cool air generated based on heat-exchange with refrigerant circulating in a refrigeration cycle to store the food in an optimal state.

In some cases, the refrigerators may have an increased size and provide multi-functions according to the trends of change of dietary life and high quality expectation. In some cases, the refrigerators may include various structures and convenience devices for users' convenience.

In some cases, the refrigerator may have a storage space partitioned into an upper side and a lower side, where the upper storage space and the lower storage space are opened and closed by an upper door and a lower door, respectively. In some examples, an upper end and a lower end of each of the upper door and the lower door may be supported by a hinge device and mounted rotatably, and the storage spaces vertically disposed at the upper and lower sides may be opened and closed by rotation of the upper door and the lower door, respectively.

In some cases, the refrigerator may include an intermediate hinge provided on a front surface of a main body, and a rotation shaft that vertically extends from a horizontal support portion, where the support portion protrudes between an upper door and a lower door to support a lower end of the upper door and an upper end of the lower door.

In some cases, the refrigerator may be in close contact with a wall surface or furniture. The refrigerator may be arranged in parallel to the wall surface. In some cases, an interference between adjacent objects may occur when the door rotates due to a thickness of the door. In some cases, when the refrigerator is installed, the refrigerator may be installed to protrude relative to the adjacent lateral objects or to be spaced apart by a predetermined interval from the adjacent lateral objects to avoid the interference with the objects.

In some cases, the refrigerator may be installed as a built-in type or installed to be continuous with adjacent furniture or home appliances.

In some cases, the refrigerator may include a hinge device having a rotation structure that has multi-joints. The hinge device may be relatively thick and have a large width. In some cases, a pair of hinges may support upper and lower doors, and the hinges may be disposed between the upper and lower doors of the refrigerator. In some cases, an interval between the upper door and the lower door may increase due to the size of the hinges.

In some cases, where a weight of the upper door is heavy, the hinge supporting the upper door may droop downward due to the characteristics of the extending link structure of the multi-hinge, which may interfere the normal opening and closing operation of the door due to an interference with the hinge supporting the lower door.

In some cases, where the hinge is designed to be thicker to avoid the drooping of the upper door or the hinge supporting the upper door, the interval between the upper door and the lower door may increase due to the thinness of the hinge.

SUMMARY

The present disclosure describes a link hinge that can minimize an interval between an upper door and a lower door that are supported by the link hinge, and a refrigerator including the link hinge.

The present disclosure also describes a link hinge including a plurality of links that are disposed between refrigerator doors and spaced vertically from each other to secure an operation of the link hinge so that the refrigerator doors are opened and closed, and a refrigerator including the link hinge.

The present disclosure further describes a link hinge that can avoid interference between an upper link module connected to an upper door and a lower link module rotatably connected to a lower door, and a refrigerator including the link hinge.

The present disclosure further describes a link hinge that can reduce drooping of a door in repeated opening and closing of the door, and a refrigerator including the link hinge.

According to one aspect of the subject matter described in this application, a multi-joint link hinge includes a hinge bracket, a plurality of side portions, a link module, and a door bracket coupled to the link module. The hinge bracket includes a base portion that defines a plurality of screw coupling holes at a vertical surface of the base portion, and a plurality of side portions that extend from the base portion in a horizontal direction and are spaced apart from each other in a vertical direction. The link module includes a plurality of links that are coupled to the plurality of side portions along an axis that extends in the vertical direction, where the plurality of links is disposed between the plurality of side portions.

Implementations according to this aspect can include one or more of the following features. For example, the link module can include an upper link module coupled to the hinge bracket and configured to rotate about a rotation shaft, and a lower link module disposed vertically below the upper link module and configured to rotate about the rotation shaft independent of the upper link module. In some examples, the multi-joint link hinge can further include a supporter that is disposed between the upper link module and the lower link module, where the supporter is configured to be in contact with the upper link module or the lower link module based on operation of the upper link module or the lower link module.

In some implementations, the supporter can have a plate shape and include a front guide portion disposed at a front end of the supporter, where a height of the front guide portion decreases toward the front end of the supporter, and a rear guide portion disposed at a rear end of the supporter, where a height of the rear guide portion decreases toward the rear end of the supporter. In some examples, the supporter can include an intermediate portion disposed between the front guide portion and the rear guide portion, where the intermediate portion has a constant height.

In some implementations, the multi-joint link hinge can include a supporting ball disposed at the supporter and configured to roll relative to the upper link module and the lower link module, where at least a portion of the supporting ball can be exposed to an outside of the supporter and in contact with the upper link module and the lower link module. In some examples, each of the upper link module and the lower link module can be made of a metal material, and the supporter has a plate shape and is made of a polyoxymethylene (POM) material.

In some implementations, the multi-joint link hinge can include a spacer that is disposed inside the hinge bracket and penetrated by the rotation shaft, where the spacer maintains a fixed interval between the upper link module and the lower link module.

In some implementations, the plurality of links of the lower link module can include a lower main link that is coupled to the hinge bracket and faces a bottom surface of the upper link module, a first lower sub link that is coupled to each of a first side of the lower main link and a first side of the door bracket, a second lower sub link that is coupled to each of a second side of the lower main link and a second side of the door bracket, and a lower connection link that is coupled to the first side of the lower main link and the second lower sub link.

In some examples, the lower main link can define a supporter mounting portion that is recessed from a top surface of the lower main link and supports the supporter, where the supporter mounting portion has a shape corresponding to the supporter.

According to another aspect, a multi-joint link hinge includes a hinge bracket, a link module, and a door bracket coupled to the link module. The hinge bracket includes a base portion that defines a plurality of screw coupling holes at a vertical surface of the base portion, and a support portion that protrudes from the vertical surface and extends in a horizontal direction. The link module includes a plurality of links, where each link is coupled to a top surface of the support portion or a bottom surface of the support portion. The door bracket is coupled to the plurality of links.

Implementations according to this aspect can include one or more of the following features. For example, the hinge bracket can further include a shielding portion that is disposed at an end of the support portion and covers a side surface of the hinge bracket. In some implementations, the link module can include an upper link module coupled to the hinge bracket and configured to rotate about a rotation shaft, and a lower link module disposed vertically below the upper link module and configured to rotate about the rotation shaft independent of the upper link module.

In some examples, the multi-joint link hinge can include a main rotation shaft and a sub rotation shaft that are coupled to the plurality of links. The plurality of links of the upper link module can include an upper main link coupled to the main rotation shaft, a first upper sub link coupled to the sub rotation shaft, a second upper sub link coupled to the first upper sub link along the main rotation shaft or the sub rotation shaft, and an upper connection link coupled to the upper main link along the main rotation shaft or the sub rotation shaft.

In some examples, the multi-joint link hinge includes a main rotation shaft and a sub rotation shaft that are coupled to the plurality of links. The plurality of links of the lower link module can include a lower main link coupled to the main rotation shaft, a first lower sub link coupled to the sub rotation shaft, a second lower sub link coupled to the first lower sub link along the main rotation shaft or the sub rotation shaft, and a lower connection link coupled to the lower main link along the main rotation shaft or the sub rotation shaft.

According to another aspect, a refrigerator includes a cabinet that defines a storage space, a door configured to rotate relative to the cabinet and to open and close at least a portion of the storage space, a hinge bracket fixed to a front surface of the cabinet, and a link module coupled to the hinge bracket along a rotation axis of the door and configured to rotate the door relative to the cabinet, where the link module is fixed to a top surface of the door or a bottom surface of the door.

According to another aspect, a refrigerator includes a cabinet that defines an upper storage space and a lower storage space disposed vertically below the upper storage space, a barrier that partitions the upper storage space and the lower storage space from each other, an upper door configured to rotate relative to the cabinet and to open and close the upper storage space, a lower door configured to rotate relative to the cabinet and to open and close the lower storage space, a hinge bracket fixed to a front surface of the barrier, an upper link module coupled to the hinge bracket along a rotation axis of the upper door and configured to rotate the upper door relative to the cabinet, where the upper link module is fixed to a bottom surface of the upper door, and a lower link module coupled to the hinge bracket along a rotation axis of the lower door and configured to rotate the lower door relative to the cabinet, where the lower link module is fixed to a top surface of the lower door.

Implementations according to this aspect can include one or more of the following features. For example, the refrigerator can further include a supporter disposed vertically above the lower link module and configured to support the upper link module in a state in which the lower door is closed. In some implementations, the refrigerator can further include a supporting ball disposed at the supporter and configured to roll relative to the upper link module and the lower link module, where at least a portion of the supporting ball is exposed to an outside of the supporter and in contact with the upper link module and the lower link module.

In some implementations, the hinge bracket can include a base portion that defines a plurality of screw coupling holes at a vertical surface of the base portion, and a support portion that protrudes from the vertical surface and extends in a horizontal direction.

The details of one or more implementations are set forth in the accompanying drawings and the description below. Other features will be apparent from the description and drawings, and from the claims.

DETAILED DESCRIPTION

Hereinafter, detailed implementations will be described in detail with reference to the accompanying drawings. However, the scope of the present disclosure is not limited to the following example implementations of the present disclosure, and other regressive disclosures or other implementations included in the scope of the spirits of the present disclosure can be easily proposed through addition, change, deletion, and the like of other elements.

Figure 1:
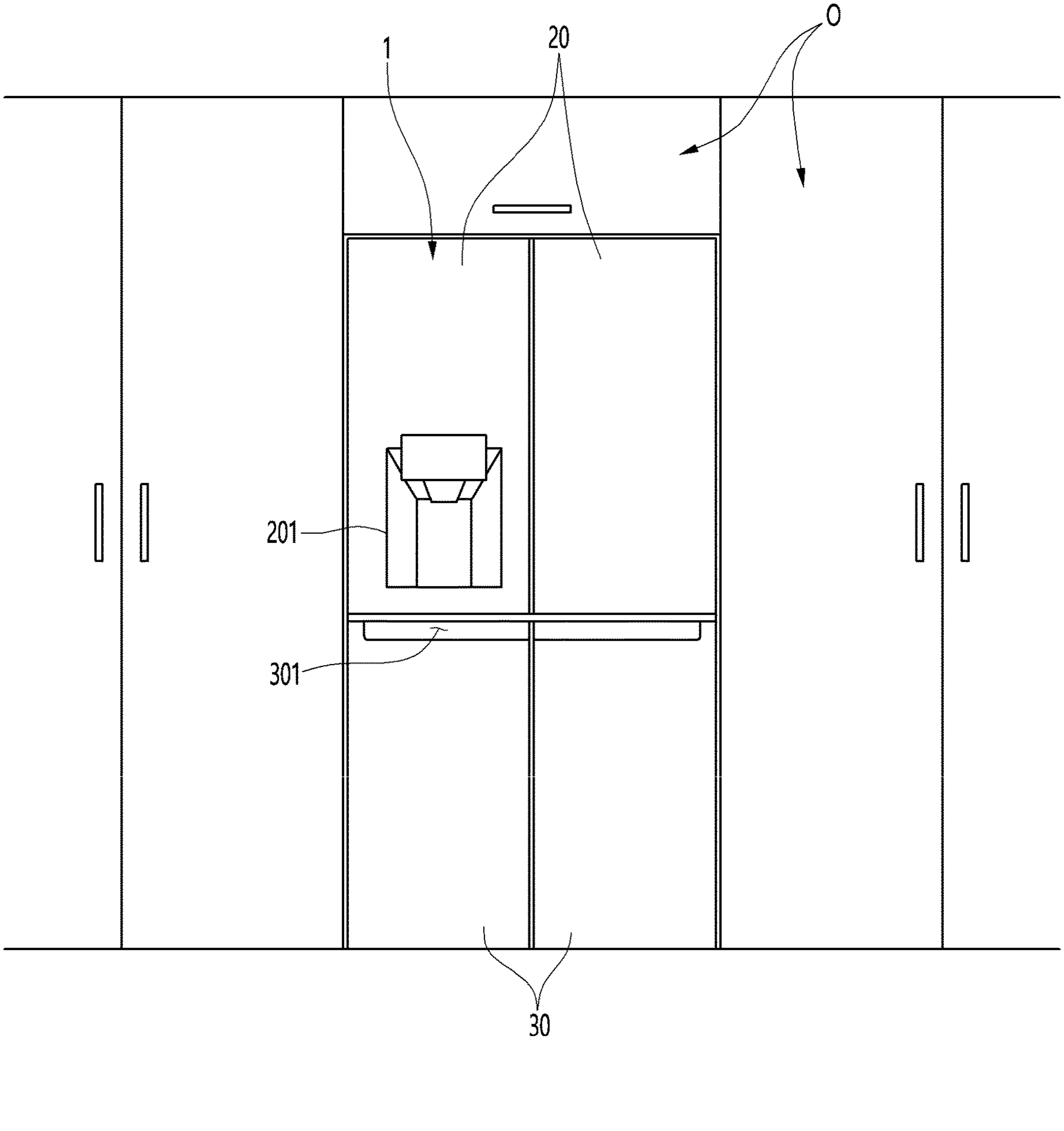
FIG. 1 is a perspective view illustrating an example of a refrigerator.

In the present disclosure, a direction facing a front surface of the door illustrated in FIG. 1 is defined as a front direction, a direction facing the inside of the refrigerator with respect to the front surface of the door is defined as a rear direction, a direction facing a bottom surface on which the refrigerator is installed is defined as a downward direction, and a direction away from the bottom surface is defined as an upward direction.

Figure 2:
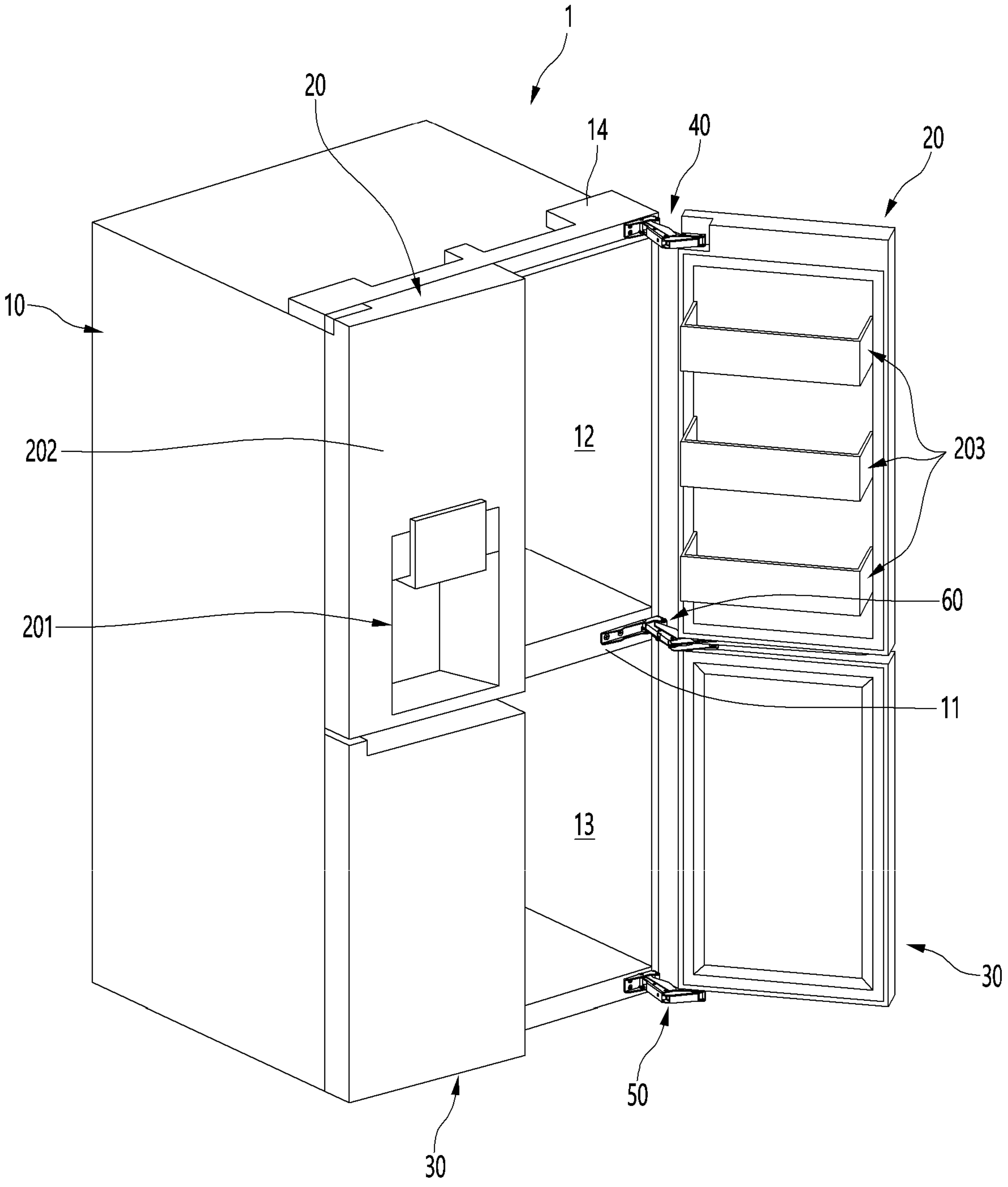
FIG. 2 is a perspective view illustrating an example of an upper door and a lower door of the refrigerator that are opened.

FIG. 1 is a perspective view illustrating an example of a refrigerator. FIG. 2 is a perspective view illustrating an example state in which an upper door and a lower door of the refrigerator are opened.

Referring to the drawings, a refrigerator 1 includes a cabinet 10 defining a storage space having an opened front surface and a door opening or closing the storage space. In some examples, an outer appearance of the refrigerator 1 can be defined by a cabinet 10 and doors 20 and 30.

In some implementations, the refrigerator 1 can be mounted so as to harmonize with furniture or wall O of an indoor space. For example, as illustrated in FIG. 1, the refrigerator 1 can be installed in the indoor space such as a kitchen and can be disposed adjacent to the furniture or the wall O to harmonize with each other. That is, a space corresponding to a size of the refrigerator 1 can be provided in the furniture or the wall O, and the refrigerator 1 can be accommodated or disposed in a built-in type. In some examples, a plurality of refrigerators 1 can be continuously disposed, or other home appliances can be continuously disposed, in addition to the furniture or the wall O.

In some implementations, a front surface of the refrigerator 1, e.g., front surfaces of the doors 20 and 30, can be very close to the furniture or the wall O and be disposed on the same or adjacent plane to realize a sense of unity. In some examples, the front surface of the doors 20 and 30 can be made of the same material or a material having the same texture as the furniture or the wall O to realize a sense of unity with the furniture or the wall O.

Looking in more detail with respect to a structure of the refrigerator 1, the cabinet 10 can define a storage space that is partitioned vertically. For example, the cabinet 10 can be partitioned vertically by a barrier 11 to define an upper storage space 12 above the barrier 11 and a lower storage space 13 below the barrier 11. For example, the refrigerator 1 can be provided in a bottom freeze type, and thus, the upper storage space 12 can be used as a refrigerating compartment, and the lower storage space 13 can be used as a freezing compartment. Thus, the upper storage space 12 can be referred to as a refrigerating compartment, and the lower storage space 13 can be referred to as a freezing compartment.

A hinge cover 14 can be provided at a front end of a top surface of the cabinet 10, and the hinge cover 14 can be disposed to shield a hinge mounting member connected to the upper hinge 40 to be described below. In some examples, the upper hinge 40 can be fixed to the top surface of the cabinet 10 and can be disposed on a front surface of the hinge cover 14.

In some examples, the doors 20 and 30 can include an upper door 20 and a lower door 30, which open and close the upper storage space 12 and the lower storage space 13, respectively.

The upper door 20 can be rotatably mounted on the cabinet 10 to open and close the upper storage space 12 by the rotation thereof. In some examples, upper and lower ends of the upper door 20 can be supported by an upper hinge 40 and a link hinge 60, respectively, and the upper door 20 can rotate by the upper hinge 40 and the link hinge 60 to open and close each of the storage spaces 12 and 13.

The upper door 20 can be provided in a pair on both left and right sides, and each of the upper doors 20 can independently rotate to open and close the upper storage space 12. In some examples, the upper hinge 40 and the link hinge 60 can be coupled to the pair of upper doors 20 disposed on both left and right sides, respectively, and can be rotatably mounted to the cabinet 10.

A dispenser 201 that is capable of dispensing water or ice at the outside of the upper door 20 in a state in which the upper door 20 is closed can be provided on the upper door 20. In some examples, an accommodation member such as a door basket for storing food can be further provided on a rear surface of the upper door 20. In some examples, a panel 202 or a plate that defines an outer appearance of the upper door 20 can be disposed on a front surface of the upper door 20, and the panel 202 or plate can be made of various materials, for example, tempered glass, a metal, a tile, and the like.

The lower door 30 can be rotatably mounted on the cabinet 10 to open and close the lower storage space 13 by the rotation thereof. For example, upper and lower ends of the lower door 30 can be supported by the link hinge 60 and a lower hinge 50, respectively, and the lower door 30 can rotate by the link hinge 60 and the lower hinge 50 to open and close each of the lower storage space 13.

The lower door 30 can be provided in a pair on both left and right sides, and each of the upper doors 20 can independently rotate to open and close the lower storage space 13. In some examples, the link hinge 60 and the lower hinge 50 can be coupled to the pair of lower doors 30 disposed on both the left and right sides, respectively, and can be rotatably mounted to the cabinet 10. In some examples, the lower door 30 can also be configured to include a panel or plate having the same outer appearance as the upper door 20.

In some implementations, a handle or a handle space 301, which can receive a user's hand, can be defined between a lower end of the upper door 20 and an upper end of the lower door 30. In some examples, a handle for manipulating the opening and closing of the upper door 20 and the lower door 30 can be disposed on a top surface of the handle space 301, i.e., a bottom surface of the upper door 20 and a bottom surface of the handle space 301, i.e., a top surface of the lower door 30. For example, the handle can be recessed in a groove shape.

The upper hinge 40, the link hinge 60, and the lower hinge 50 can rotate in the same trajectory, and the upper door 20 and the lower door 30 can smoothly rotate without an interference with the furniture or the wall O while opened and closed.

Hereinafter, an operation structure of the upper hinge for opening the door will be described.

Figure 3:
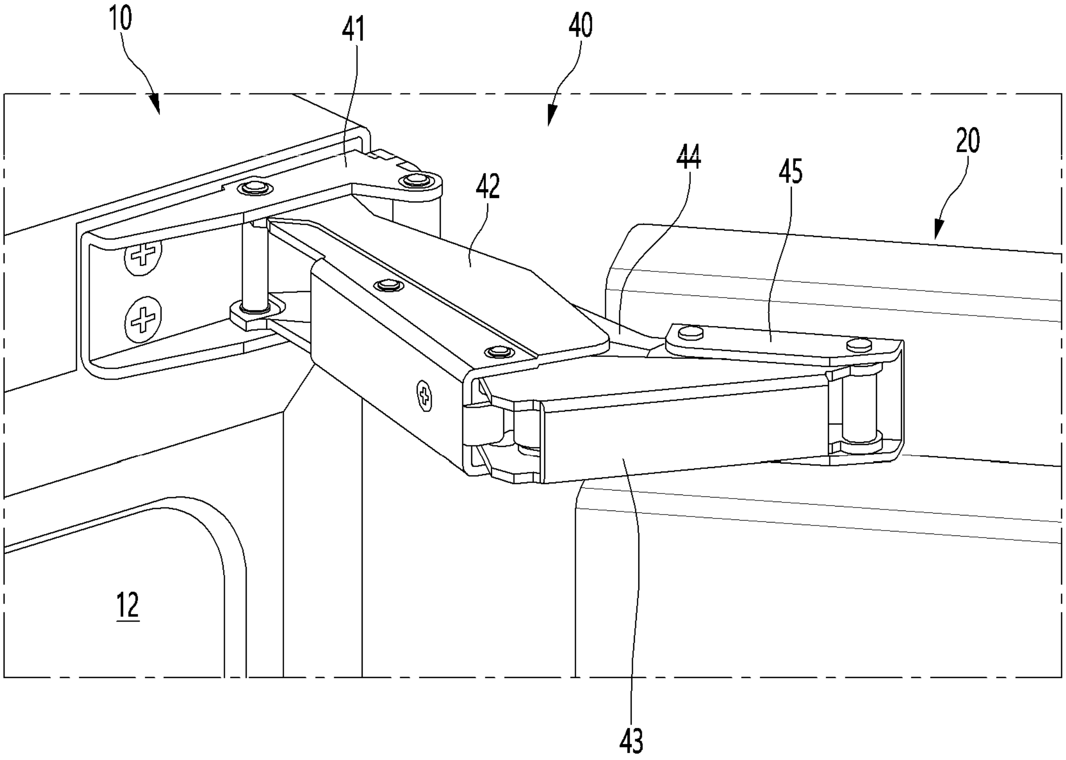
FIG. 3 is a partial perspective view illustrating an example of an upper hinge.
Figure 4:
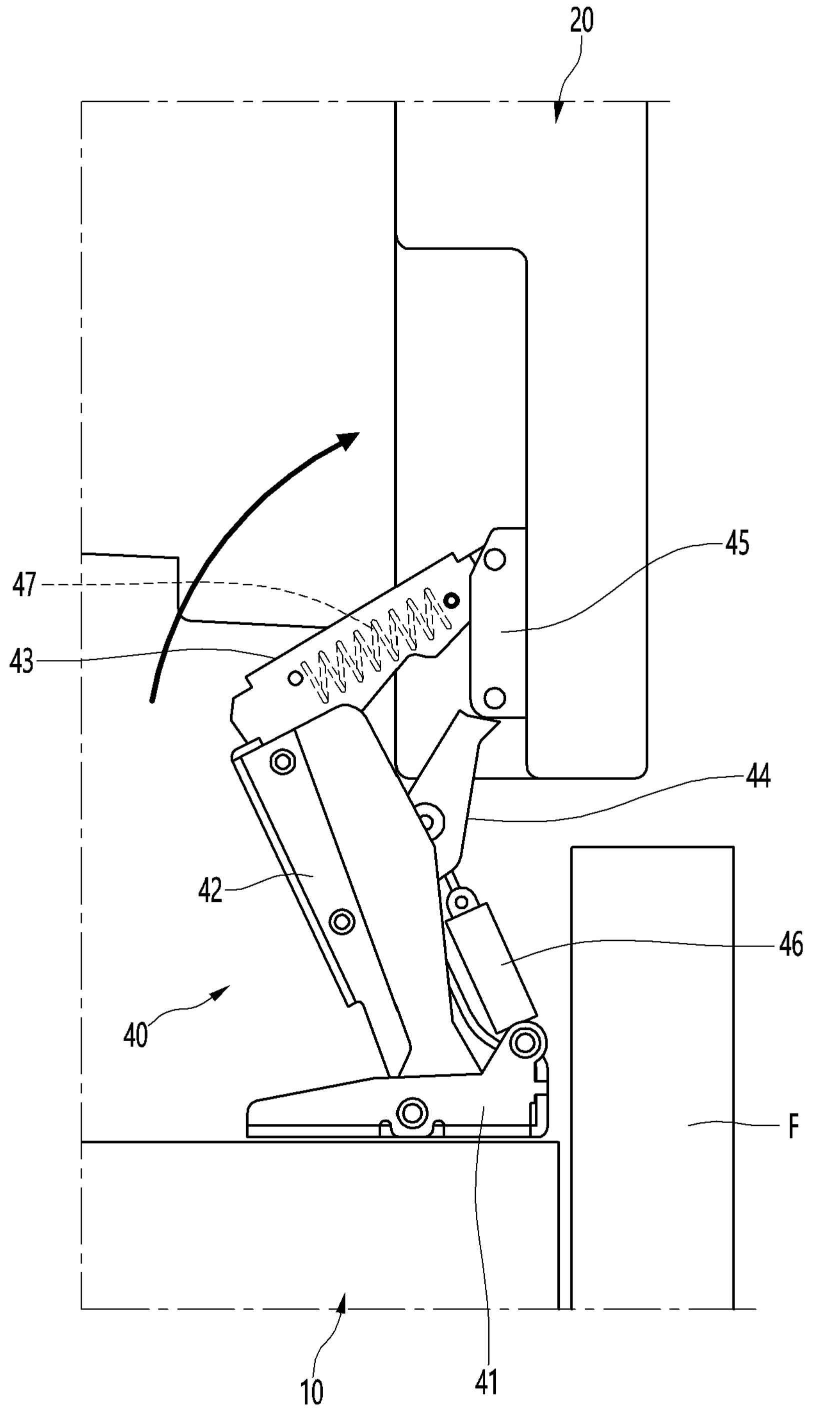
FIG. 4 is a view illustrating an example of the upper door that is open, a wall, and the upper hinge.
Figure 5:
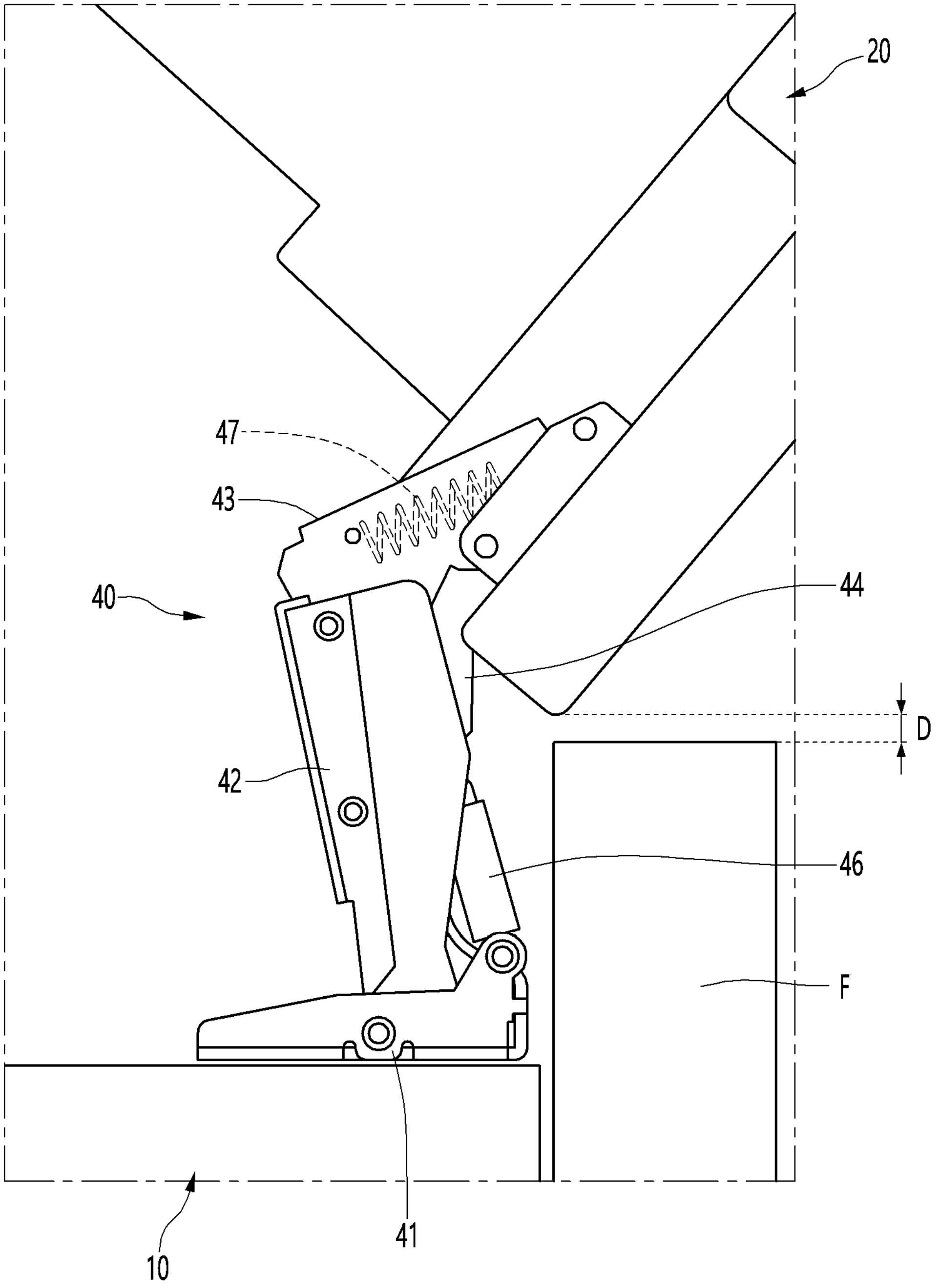
FIG. 5 is a view illustrating an example of the door that is further open, the wall, and the upper hinge.

FIG. 3 is a partial perspective view illustrating a state in which the upper hinge is mounted. In some examples, FIG. 4 is a view illustrating a state of the door, a wall, and the upper hinge in a state in which the upper door is opened. In some examples, FIG. 5 is a view illustrating a state of the door, the wall, and the upper hinge in a state in which the upper door is fully opened.

As illustrated in the drawings, the upper hinge 40 can be mounted at a corner defined by an upper front end and a side end of the cabinet 10 and can be connected to one end of a top surface of the upper door 20.

The upper hinge 40 can have a structure in which a plurality of links are coupled to each other, and thus, when the upper hinge 40 rotates, the upper door 20 can rotate while moving in a direction away from the front surface of the cabinet 10.

The rotation trajectory of the upper door 20 can be determined by the structure of the plurality of links constituting the upper hinge 40, and a trajectory in which a pair of upper doors 20 disposed side by side and the furniture or wall O disposed at one side do not interface with each other can be implemented. Thus, the upper hinge 40 can be referred to as a multi-link.

In some examples, the upper hinge 40 and the lower hinge 50 can have the same structure. In some examples, the link hinge 60 has a structure different from that of each of the upper hinge 40 and the lower hinge 50, but has the same rotational trajectory so that the rotation of the upper door 20 and the lower door 30 is smoothly performed along the same trajectory.

Looking at the structure of the upper hinge 40 in more detail, the upper hinge 40 can include a hinge bracket 41 mounted on the cabinet 10, a main link 42 axially coupled to the hinge bracket 41, a first sub link 43 and a second sub link 44, which are axially coupled to the main link 42, and a door bracket 45 which is axially coupled to ends of the first sub link 43 and the second sub link 44 and is coupled to a top surface of the upper door 20. For example, where two parts are axially coupled to each other, the two parts can be rotatably coupled to each other along one or more rotation axes that extend in the coupling direction.

Each of the links 42, 43, 44, and 45 can be axially coupled to define a quadrilateral shape as a whole and can be folded or unfolded to provide a trajectory through which the upper door 20 rotates. In some examples, the hinge bracket 41 and the second sub link 44 can be connected to each other by a linear damper 46 having both ends that are axially coupled to each other. The linear damper 46 can reduce rotation when the upper hinge 40 is folded, i.e., when the upper door 20 is closed to alleviate an impact.

In some examples, the first sub link 43 can be provided with a spring 47 that is tensioned or compressed according to the rotation of the first sub link 43 to force the rotation of the first sub link 43. The spring 47 can be a compression spring or a tension spring. The spring 47 can be compressed while the upper door 20 is closed and can be restored immediately before the upper door 20 is closed. Thus, the spring 47 can assist the rotation of the first sub link 43 at the moment at which the upper door 20 is closed by the spring 47. Therefore, the upper door 20 can be effectively closed even when the linear damper 46 operates.

The plurality of links 42, 43, 44, and 45 constituting the upper hinge 40 can rotate while maintaining a set trajectory by the action of the linear damper 46 and the spring 47. When the plurality of links 42, 43, 44, and 45 rotate in a set trajectory, the upper door 20 can rotate without interfering with the furniture or the wall O to open the upper storage space 12.

In some examples, in the state in which the upper door 20 is closed, a side end of the upper door 20 can be spaced a set interval from the adjacent furniture or wall O. For example, the set interval can be about 3 mm. Thus, while ensuring the initial rotation of the upper door 20 so as not to interfere, in the state in which the upper door 20 is closed, a space between the upper door 20 and the furniture or the wall O can be narrowed to realize the sense of unity.

When the upper door 20 is opened, the main link 42, the first sub link 43, the second sub link 44, and the door bracket 45 can rotate so that the end of the upper door 20 rotates so as not to interfere with the furniture or the wall O. That is, a distance between the end of the upper door 20 and a front surface of the furniture or the wall O can be spaced a set interval from each other. For example, the set interval D can be within about 9 mm.

As described above, when the upper door 20 rotates, the upper door 20 can rotate by the upper hinge 40, and in particular, the upper door can rotate along the corner of the furniture or the wall O while maintaining the set interval so as not to interfere with the corner of furniture or the wall O.

In some implementations, the operation of the upper door 20 at one side of the pair of upper doors 20 has been described as a reference, but the other upper door 20 can also have the same operation structure. In some examples, the lower door can also have a structure that is rotatably supported by the lower hinge 50 having the same structure as the upper hinge 40 and can have the same operating structure.

Figure 6:
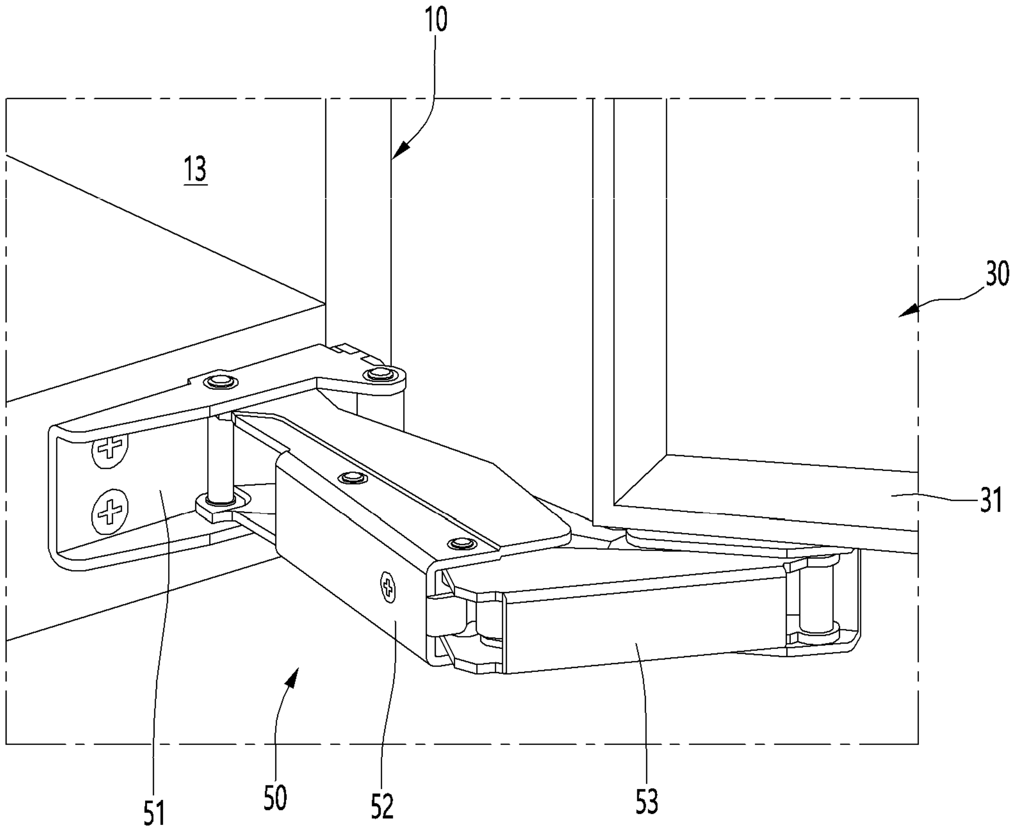
FIG. 6 is a partial perspective view illustrating an example of a lower hinge.

FIG. 6 is a partial perspective view illustrating a state in which the lower hinge is mounted.

In detail, as illustrated in in FIG. 6, the lower hinge can be mounted on a front lower end of the cabinet 10 to rotatably support a lower end of the lower door 30 at a lower side.

The lower door 30 can be provided in a pair like the upper door 20 and can be disposed at both left and right sides.

That is, the lower hinge 50 can include a hinge bracket 51 mounted on the cabinet 10, a main link 52 axially coupled to the hinge bracket 51, a first sub link 53 and a second sub link 54, which are axially coupled to the main link 52, and a door bracket 55 which is axially coupled to ends of the first sub link 53 and the second sub link 54 and is coupled to a bottom surface of the lower door 30.

In addition, each of the hinge bracket 51 and the second sub link 54 can be provided with a lower linear damper having both ends that are axially coupled and a spring for forcing the rotation of the first sub link 53.

The link hinge 600 can be provided on the front surface of the cabinet 10, and each of the bottom surface of the upper door 20 and the top surface of the lower door 30 can be independently rotatably supported by the link hinge 600.

The link hinge 60 can be provided on the front surface of the cabinet 10, and each of the bottom surface of the upper door 20 and the top surface of the lower door 30 can be independently rotatably supported by the link hinge 60.

Hereinafter, the link hinge 60 will be described in more detail with reference to the drawings.

Figure 7:
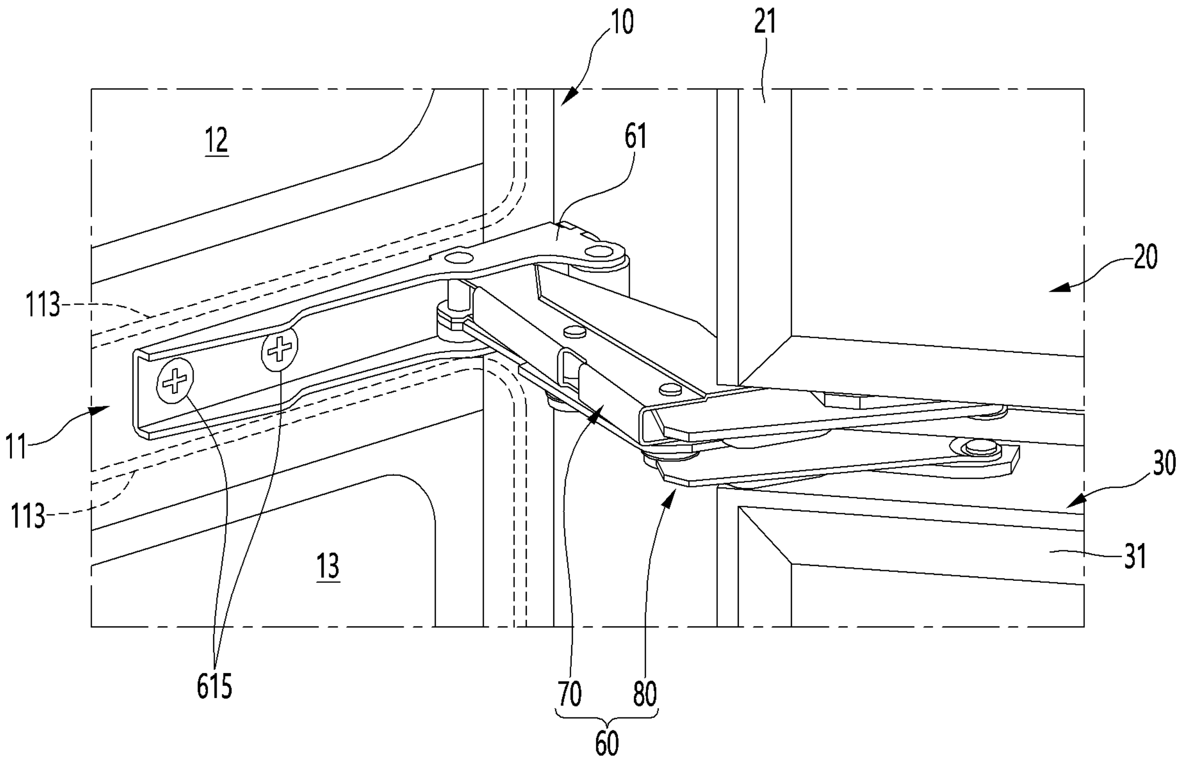
FIG. 7 is a partial perspective view illustrating an example of a link hinge.
Figure 8:
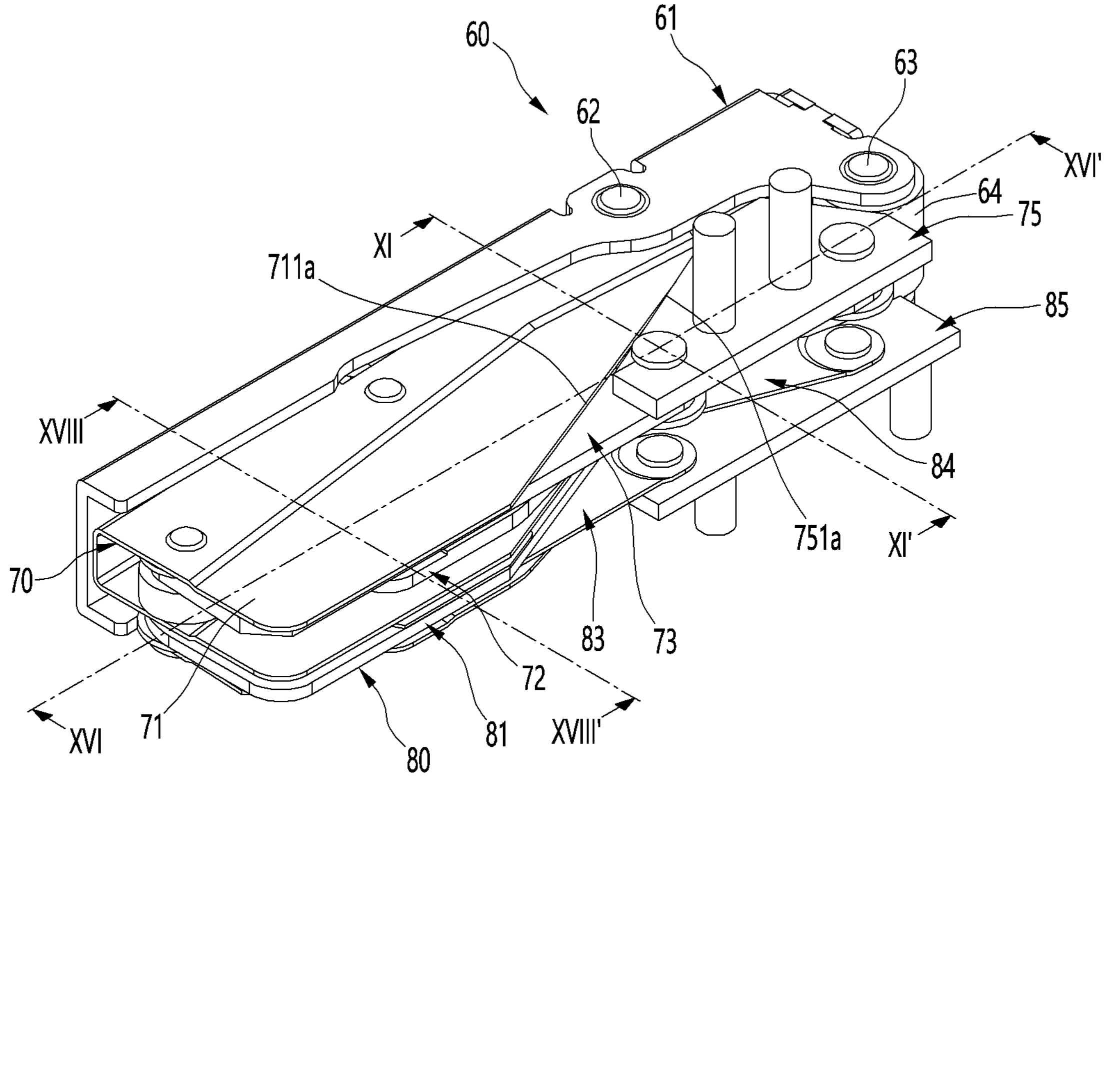
FIG. 8 is a perspective view illustrating an example of a folded state of the link hinge.
Figure 9:
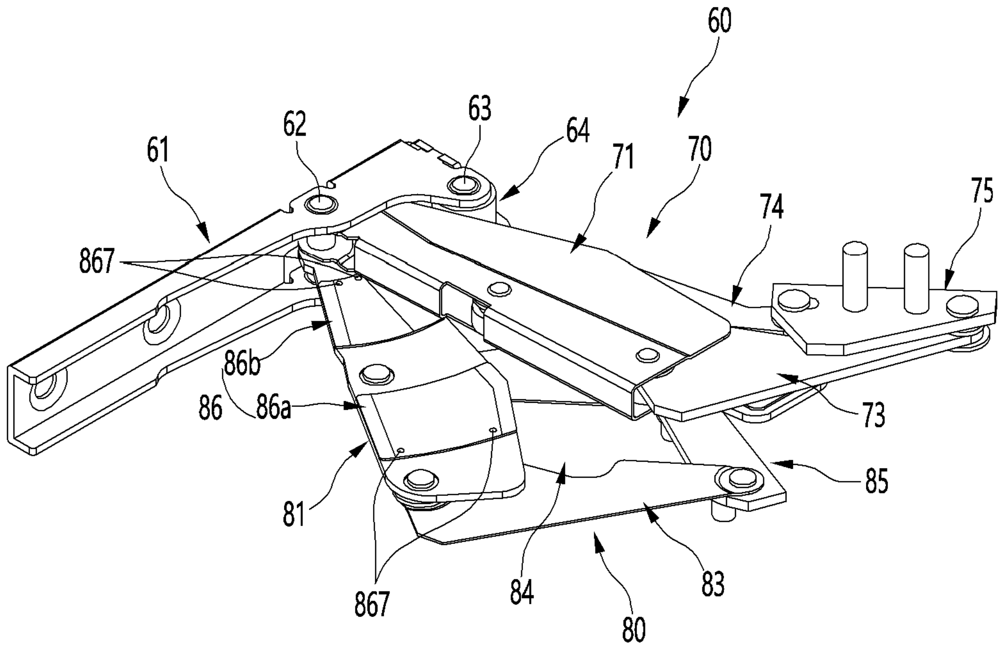
FIG. 9 is a perspective view illustrating an example of an unfolded state of the link hinge at a predetermined angle.

FIG. 7 is a partial perspective view illustrating a state in which the link hinge is mounted. In some examples, FIG. 8 is a perspective view illustrating a state in which the link hinge is folded. In some examples, FIG. 9 is a perspective view illustrating a state in which the link hinge is unfolded at a predetermined angle.

As illustrated in the drawings, the link hinge 60 rotatably supports the upper door 20 and the lower door 30. Thus, the link hinge 60 can be disposed between the upper door 20 and the lower door 30. In detail, the link hinge 60 can be disposed in a space between the bottom surface of the upper door 20 and the top surface of the lower door 30 and can be mounted on the front surface of the cabinet 10.

The link hinge 60 can be mounted on a front surface of the barrier 11 and be connected to the bottom surface of the upper door 20 and the top surface of the lower door 30, respectively, so that the upper door 20 and the lower door 30 rotate independently.

The link hinge 60 can be called a multi-link hinge or an articulated multi-joint link hinge in that the rotation trajectory of the door 20 is determined by a plurality of link structures and can also be called a center hinge in that the link hinge 60 is disposed between the upper door 20 and the lower door 30.

That is, the link hinge 60 can include a hinge bracket 61 mounted on the barrier 11 and an upper link module 70 and a lower link module 80, which include a plurality of links that are axially coupled to the hinge bracket 61. The upper link module 70 can be coupled to the bottom surface of the upper door 20, the lower link module 80 can be coupled to the top surface of the lower door 30.

The upper link module 70 and the lower link module 80 can be vertically disposed in an inner region of the hinge bracket 61. That is, a thickness of the link hinge 60 can be determined by a vertical width of the hinge bracket 61, and a sum of the vertical widths of the upper link module 70 and the lower link module 80 can be equal to or less than a sum of the vertical widths of the hinge bracket 61.

In some examples, the upper link module 70 can have a structure that supports the upper door 20 at a lower side. Thus, possibility of drooping or deformation of the upper door 20 due to a load thereof can be relatively high. On the other hand, the lower link module 80 can have a structure that supports the lower door 30 at an upper side, i.e., a structure to which a relatively low load is applied structurally. Substantially, the lower door 30 can be supported by the lower hinge 50.

Thus, the upper link module 70 can have a thickness greater than that of the lower link module 80 to prevent or reduce drooping of the upper link module 70 or deformation of the upper door 20 downward by the load of the upper door 20. A limited width of the link hinge 60, i.e., the vertical width of the upper link module 70 within the vertical width of the hinge bracket 61 can be designed to be greater than the vertical width of the lower link module 80 to help to prevent the upper link module 70 from drooping or being deformed.

The vertical width of the hinge bracket 61 can be determined according to the vertical width of the barrier 11. The barrier 11 can be designed to have a thickness at which the upper storage space 12 and the lower storage space 13 are partitioned in an adiabatic state.

In some implementations, a portion of the upper door gasket 21 and the lower door gasket 31, which are provided along rear circumferences of the upper door 20 and the lower door 30 may not interfere with the link hinge 60 and be in close contact with the front surface of the barrier 11. In addition, a heating member 113 can be disposed along a circumference of the upper storage space 12 and a circumference of the lower storage space 13 in addition to the barrier 11. For example, the heating member can be provided as a hot gas pipe or a heater.

The heating member 113 can be configured to prevent condensation from being generated on the front surface of the cabinet 10 and can be provided inside the barrier 11 to extend along the barrier 11. In some examples, the heating member 113 can be disposed along each of the upper storage space 12 and the lower storage space 13 and thus can be spaced apart from each of upper and lower portions of the hinge bracket 61. The link hinge 60, i.e., the hinge bracket 61 can be mounted on the front surface of the barrier 11. In some examples, the hinge bracket 61 can be disposed between the heating members 113 that are disposed vertically and can be disposed between the upper door gasket 21 and the lower door gasket 31.

Thus, as the vertical width of the hinge bracket 61 are minimized, an interval between the heating members 113, which are disposed vertically, and an interval between the upper door gasket 21 and the lower door gasket 31 can be designed to be narrower. Thus, the thickness of the barrier 11 can be also reduced to secure storage capacity of each of the upper storage space 12 and the lower storage space 13. As described above, the vertical width of the link hinge 60 within a range that allows the normal opening and closing operation of the upper door 20 and the lower door 30 can be minimized.

In some examples, to minimize the vertical width of the link hinge 60, the upper link module 70 and the lower link module 80 can be disposed together on one hinge bracket 61. In some examples, the link hinge 60 can have a compact structure to occupy a minimum space between the cabinet 10, the upper door 20, and the lower door 30. Thus, when the upper door 20 and the lower door 30 are closed so that both the upper link module 70 and the lower link module 80 are fully folded, as illustrated in FIG. 8, the link hinge 60 can have an approximately hexahedral shape and also can have a shape in which the plurality of links constituting the hinge bracket 61, the upper link module 70, and the lower link module 80 correspond to each other so as not to interfere with each other in a state in which the plurality of links are folded.

The upper link module 70 and the lower link module 80 are configured to have basically the same rotation trajectory, but only have a difference in thickness and coupling structure due to the thickness, and thus, lengths and coupling structures of the links can be the same as or similar to each other.

In some implementations, to stable open and close the upper door 20 and the lower hinge 50, the link hinge 60 can have the same rotation trajectory as each of the upper hinge 40 and the lower hinge 50. Thus, the configurations of the upper link module 70 and the lower link module 80 constituting the link hinge 60 can correspond to the configurations of the upper hinge 40 and the lower hinge 50, respectively.

The upper link module 70 and the lower link module 80 are mounted to the hinge bracket 61 to have the same rotation axis, but can rotate independently. The main rotation shaft 62 and the sub rotation shaft 63 mounted on the hinge bracket 61 can be disposed to pass through both the upper link module 70 and the lower link module 80, and the upper link module 70 and the lower link module 80 can be maintained to be spaced a predetermined interval from each other.

The upper link module 70 can support the upper door 20 from the lower side, and while the upper link module 70 rotates, the upper link module 70 can move away from the front surface of the cabinet 10 to structurally droop downward. That is, when the dispenser 201 is provided in the upper door 20, or when food is stored in the door basket 203, and when a weight of the upper door 20 itself is heavy due to the panel 202, etc., the drooping of the upper link module 70 can occur. In some examples, since the door 20 of the refrigerator 1 is filled with an insulation material and is heavy due to its thick thickness, unlike a door of general furniture, and the door 20 has a structure that is supported only by the upper link module 70, the dropping can occur.

For instance, to minimize the vertical width of the link hinge 60, the thickness of the upper link module 70 has to be configured as thin as possible, and the interval between the upper link module 70 and the lower link module 80 has to be minimized.

In some cases, the upper link module 70 can be completely prevented from drooping during the opening and closing process of the upper door 20, and the upper link module 70 can be inevitably in contact with the lower link module 80 disposed thereunder.

In some implementations, a supporter 86 can be provided between the upper link module 70 and the lower link module 80, and the upper link module 70 can be in contact with the supporter 86 during the operation thereof. The supporter 86 can have a structure so that the operation of the upper link module 70 is smoothly performed even in the state of being in contact with the upper link module 70. For example, the supporter 86 can be disposed on the top surface of the lower link module 80 and can be in contact with the bottom surface of the upper link module 70. In some examples, the supporter 86 can be provided on the bottom surface of the upper link module 70 or can be configured to be in contact with the top surface of the lower link module 80. The structure of the supporter 86 will be described in more detail below.

Hereinafter, the structure of each of the hinge bracket 61, the upper link module 70, and the lower link module 80, which constitute the link hinge 60, in addition to unexplained reference numerals, will be described in more detail with reference to the drawings.

Figure 10:
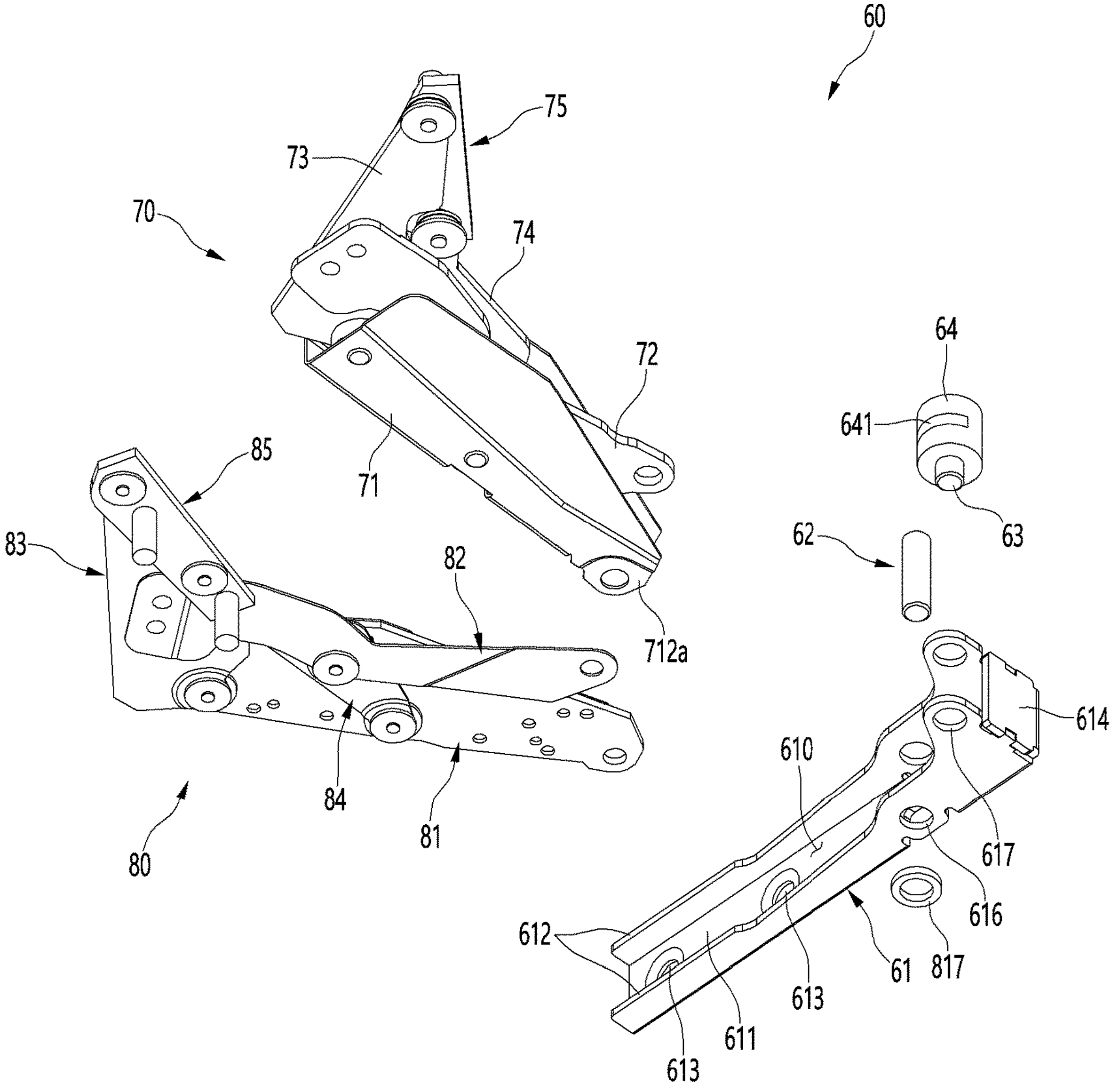
FIG. 10 is an exploded perspective view illustrating an example of the link hinge viewed from a lower side.
Figure 11:
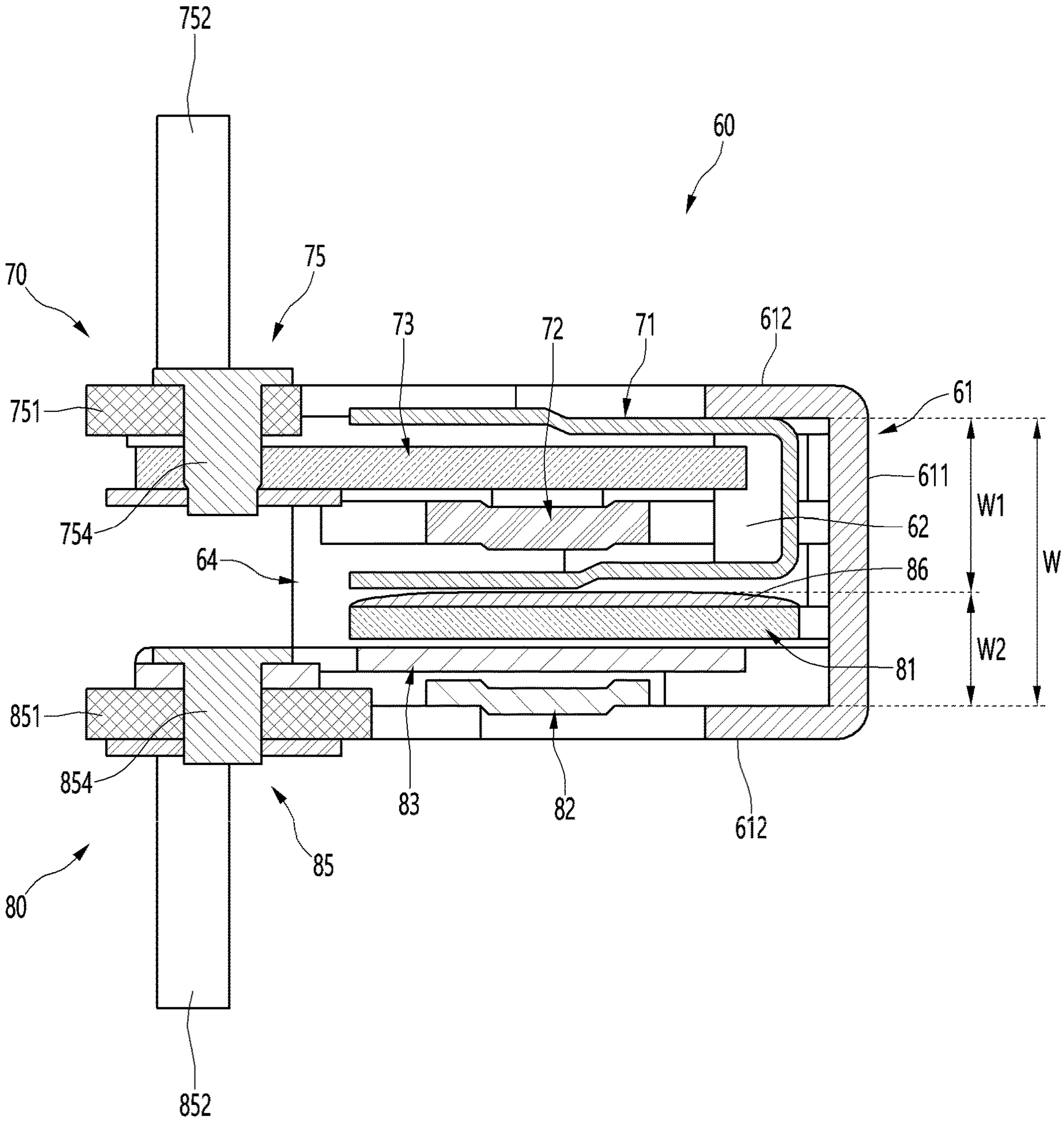
FIG. 11 is a cross-sectional view taken along line XI-XI' of FIG. 8.

FIG. 10 is an exploded perspective view illustrating the link hinge viewed from a lower side. FIG. 11 is a cross-sectional view taken along line XI-XI' of FIG. 8.

As illustrated in the drawings, the hinge bracket 61 can be provided in a plate shape made of a metal material, and the top and bottom surfaces can be bent to define an accommodation space 610 in which the upper link module 70 and the lower link module 80 are accommodated.

That is, the hinge bracket 61 can include a base portion 611 fixed in contact with the cabinet 10 and a side portion 612 that is bent to extend forward from each of upper and lower ends of the base portion 611.

The base portion 611 can be provided in a plate shape, and a plurality of coupling holes 613 can be defined in the base portion 611. A coupling member such as a screw 615 can be inserted into the plurality of coupling holes 613 to allow the hinge bracket 61 to be fixed and mounted on the front surface of the cabinet 10.

In some examples, the side portion 612 can be bent perpendicularly to the base portion 611 to extend forward. As the side portion 612 extends from one end to the other end, a width in the extension direction can increase. In some examples, a main side hole 616 and a sub side hole 617, in which the main rotation shaft 62 and the sub rotation shaft 63 passing through the side portion 612 that is disposed vertically are mounted, respectively, can be defined in the side portion 612. The sub side hole 617 can be disposed at an outer end of the side portion 612 and can be disposed further in front of the main side hole 616.

In some examples, a shape of the extending front end of the side portion 612 can correspond to a shape of each of the upper link module 70 and the lower link module 80, and thus, the upper link module 70 and the lower link module 80 may not interfere with each other even in the fully folded state.

A shielding portion 614 can be further disposed on an outer end of the base portion 611. The shielding portion 614 can be bent forward from the outer end of the base portion 611 and can be coupled to an outer end of the side portion 612. Thus, a portion of a shape of an outer surface of the hinge bracket 61 can be defined and can shield the accommodation space 610 at a side to prevent the upper link module 70 and the lower link module 80 from being exposed to a side of the hinge bracket 61. In some examples, the shielding portion 614 can connect the base portion 611 to the side portion 612 so that strength of the hinge bracket 61 is further reinforced.

In some examples, the upper link module 70 and the lower link module 80 can be disposed vertically and be penetrated by the main rotation shaft 62 and the sub rotation shaft 63 to rotate independently. The upper link module 70 and the lower link module are disposed inside the accommodation space 610 and be vertically disposed to be very close to each other to minimize the vertical width of the link hinge 60.

In some examples, a main rotation shaft spacer (e.g., washer) 817 can be further provided below the lower main link 81. Thus, the lower main link 81 can be spaced apart from the side portion 612 and can be rotatable without interfering with the side portion 612.

The sub rotation shaft 63 passing through the sub side hole 617 can sequentially pass through upper connection links 72 constituting the upper link module 70 and lower connection links 82 constituting the lower link module 80. In some examples, each of the upper connection links 72 and each of the lower connection links 82 can operate in a state of being spaced apart from each other by a sub rotation shaft spacer 64.

In detail, the sub rotation shaft spacer 64 can be disposed between the side portions 612 and be penetrated by the sub rotation shaft 63. In some examples, a spacer groove 641 can be defined in a circumferential surface of the sub rotation shaft spacer 64, and the spacer groove 641 can be defined between an upper end and a lower end of the sub rotation shaft spacer 64. An end of the upper connection link 72 can be inserted into the spacer groove 641, and the upper connection link 72 can be penetrated by the sub rotation shaft 63 in the state of being inserted into the spacer groove 641. Thus, the upper connection link 72 can be maintained in vertical height inside the upper main link 71 by the sub rotation shaft spacer 64.

In some implementations, the lower connection link 82 can be disposed below the sub rotation shaft spacer 64. Thus, the upper connection link 72 can be maintained in a state of being spaced apart from the side portion 612 and the lower connection link 82 by the sub rotation shaft spacer 64.

The upper link module 70 can include the upper main link 71, the upper connection link 72, a first upper sub link 73, a second upper sub link 74, and a door bracket 75. In some examples, the lower link module 80 can include the lower main link 81, the lower connection link 82, a first lower sub link 83, a second lower sub link 84, and a lower door bracket 85.

The upper link module 70 and the lower link module 80 can be configured as a combination of a plurality of links and can have the same coupling structure so as to have the same rotation trajectory. In some examples, the upper link module 70 and the lower link module 80 are configured to have the same rotational trajectory as the upper hinge 40 and the lower hinge 50, and thus, the upper door 20 and the lower door 30 can smoothly rotate.

The upper link module 70 and the lower link module 80 can be disposed in a region of the hinge bracket 61. In detail, a vertical width W of the hinge bracket 61 can be equal to or greater than the sum of the vertical width W1 of the upper link module 70 and the vertical width W2 of the lower link module 80. In some examples, since the upper link module 70 supports the upper door 20 from the lower side, a relatively higher load can be applied. Thus, the upper link module 70 can have a vertical width greater than that of the lower link module 80. That is, even if the upper link module 70 is thicker than the lower link module 80 and operates in a state of supporting the upper door 20, the downward drooping of the upper link module 70 and the upper door 20 can be minimized.

The supporter 86 can be disposed on the top surface of the lower link module 80, and the supporter 86 can be provided at a position facing the bottom surface of the upper link module 70. Thus, when the upper link module 70 droops downward, the bottom surface of the upper link module 70 is in contact with the top surface of the supporter 86.

The supporter 86 can allow the upper link module 70 and the lower link module 80 to move relative to each other even in the state of being in contact with the upper link module 70, and smooth rotation operation can be ensured by sliding.

The supporter 86 can be in a maximum contact state when both the upper link module 70 and the lower link module 80 are fully folded or rotate at the same angle, and in some examples, when the upper link module 70 and the lower link modules 80 rotate to cross each other, a contact area can be reduced. In some examples, when the upper link module 70 is fully unfolded while the lower link module 80 is completely folded, the contact area between the supporter 86 and the upper link module 70 can be minimized.

In some examples, when the supporter 86 is in contact with the upper link module 70, the downward drooping of the upper link module 70 can be prevented. The support 86 can allow the upper link module 70 to be maintained in the contact state, and thus, even though the interval between the upper link module 70 and the lower link module 80 is minimized, the operation of the upper link module 70 can be secured.

Hereinafter, detailed structures of the upper link module 70 and the lower link module 80 will be described in more detail with reference to the drawings.

Figure 12:
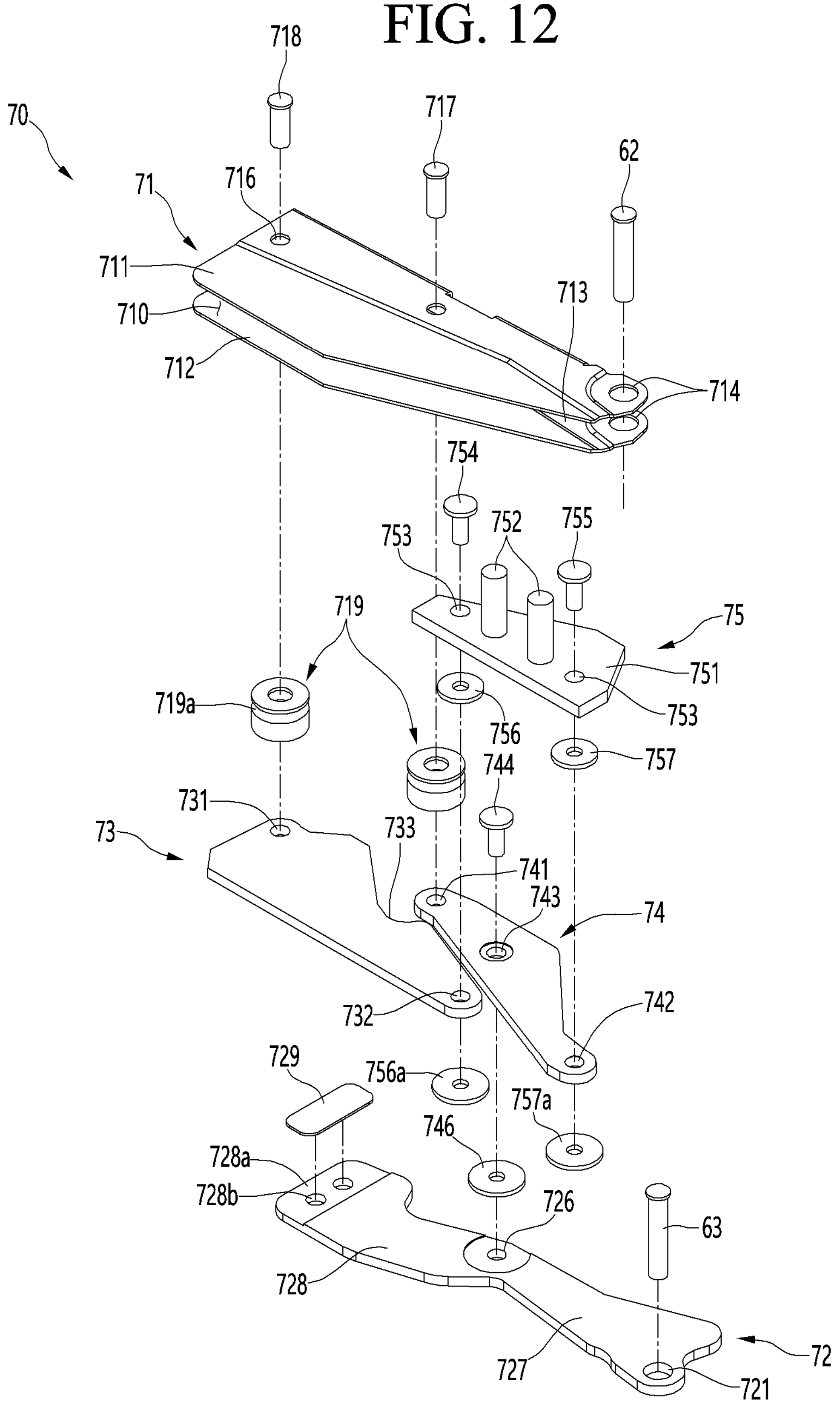
FIG. 12 is an exploded perspective view showing an example of an upper link module of the link hinge.

FIG. 12 is an exploded perspective view an example of the upper link module of the link hinge.

Referring to the drawings, the upper link module 70 can include the upper main link 71, the first upper sub link 73, the second upper sub link 74, and the door bracket 75. In some examples, the first upper sub link 73 and the second upper sub link 74 can be rotatably connected to each other between the upper main link 71 and the door bracket 75. In some examples, the upper link module 70 can further include the upper connection link 72 connecting the second upper sub link 74 to the hinge bracket 61.

Looking at this structure in more detail, the upper main link 71 can be made of a plate-shaped metal material and be bent several times to accommodate at least portion of the upper connection link 72, the first upper sub link 73, and the second upper sub link 74 therein.

The upper main link 71 can have a shape that does not interfere with the hinge bracket 61 and the upper door 20 during the rotation and can be provided so as not to interfere with the door bracket 75. That is, the hinge bracket 61, the upper main link 71, and the door bracket 75 can be provided so as not to interfere with each other during the folding or unfolding.

The upper main link 71 can include a top surface 711, a bottom surface 712, and a connection surface 713 connecting the top surface 711 to the bottom surface 712. The top surface 711 and the bottom surface 712 can be vertically bent from upper and lower ends of the connection surface 713, respectively, and can extend in the same direction. The top surface 711 and the bottom surface 712 can have the same outer shape and can be disposed to face each other. Thus, a predetermined inner space 710 can be defined by the top surface 711, the bottom surface 712, and the connection surface 713.

In some examples, the upper main hole 714 through which the main rotation shaft 62 passes can be defined in one end of each of the top surface 711 and the bottom surface

712. In some examples, the top surface 711 and the bottom surface 712 of the upper main link 71 have shaft holes 715 and 716 in which the ends of the first upper sub link 73 and the second upper sub link 74 are axially coupled to each other, respectively. Shafts 717 and 718 can pass through the shaft holes 715 and 716, and the first upper sub link 73 and the second upper sub link 74 can be rotatably coupled to each other.

A spacer 719 can be disposed on each of the shafts 717 and 718. Each of the first upper sub link 73 and the second upper sub link 74 can be disposed at an appropriate height between the top and bottom surfaces of the upper main link 71 by the spacer 719 to secure smooth rotation without interfering with the upper main link 71 and the upper connection link 72.

In detail, the spacer 719 can have a cylindrical shape, and a hole can be defined in a center of the spacer 719 so that the shafts 717 and 718 pass in the vertical direction. In some examples, a spacer groove 719*a* into which the spacer 719 is inserted can be defined in a circumferential surface of the spacer 719. Thus, in a state in which an end of each of the first upper sub link 73 and the second upper sub link 74 is inserted into the spacer groove 719*a*, the shafts 717 and 718 can pass through the upper main link 71, the spacer 719, and the first upper sub link 73 or the second upper sub link 74.

Thus, the first upper sub link 73 and the second upper sub link 74 can be coupled to each other in a state of being rotatable inside the upper main link 71. In some examples, a vertical height of each of the first upper sub link 73 and the second upper sub link 74 can be maintained in the inner space 710 of the upper main link 71 by the spacer 719 and be rotatable without interfering with other components constituting the upper link module 70.

A thickness of the upper main link 71 can be determined by the connection surface 713, and the connection surface 713 can a minimum width at which the upper connection link 72, the first upper sub link 73, and the second upper sub link are capable of being accommodated.

The first upper sub link 73 can be axially coupled to the end of the upper main link 71 by the rotation shaft 718. The first upper sub link 73 can be provided in a metal plate shape and can be supported by the spacer 719 in an inner space of the upper main link 71.

The first upper sub link 73 can extend to be connected to one side of the door bracket 75 and can be rotatably coupled by the door bracket 75 and the shaft 754. That is, the first upper sub link 73 can have shaft holes 731 and 732 in both ends thereof, and rotation shafts 718 and 754 can be coupled to the shaft holes 731 and 732 so as to be rotatably coupled to the upper main link 71 and the door bracket 75, respectively. In some examples, a washer 756 can be provided on the shaft 754 connecting the first upper sub link 73 to realize more smooth rotation of the first upper sub link 73.

A portion of an outer portion of a circumferential surface of the first upper sub link 73 can be provided in a linear shape. Thus, in a state in which the upper link module 70 is folded, the portion of the outer portion of the circumferential surface of the first upper sub link 73 can correspond to an outer end of the upper main link 71, which has a straight-line shape.

In some examples, the inner surface of the first upper sub link 73 can define a tilted and recessed space and can have a shape corresponding to a portion of a circumferential surface of the second upper sub link 74. That is, ends of the first upper sub link 73 and the second upper sub link 74 can have shapes corresponding to each other so as not to interfere with each other until the upper door 20 is fully opened. When the upper door 20 is fully opened, the upper link module 70 no longer rotates because of being coupled to be engaged with each other.

The second upper sub link 74 can have a plate shape made of a metal material, and one end of the second upper sub link 74 can be rotatably mounted to the upper main link 71 by the shaft 717. In some examples, one end of the second upper sub link 74 can be rotatably mounted between the first upper sub link 73 and the main rotation shaft 62.

In some examples, the second upper sub link 74 can extend to be connected to the door bracket 75 and can be rotatably coupled to the door bracket 75 by the shaft 755. That is, the second upper sub link 74 can have shaft holes 741 and 742 in both ends thereof, and shafts 717 and 755 can be coupled to the shaft holes 731 and 732 so as to be rotatably coupled to the upper main link 71 and the door bracket 75, respectively. In some examples, a washer 757 can be provided on the shaft 755 connecting the second upper sub link 74 to realize more smooth rotation of the second upper sub link 74.

Each of ends of the first upper sub link 73 and the second upper sub link 74 can be connected to the door bracket 75. The door bracket 75 can be configured to support the upper door 20 at the lower side and can connect the upper link module 70 to the upper door 20.

The door bracket 75 can be made of a metal material and include a plate-shaped upper plate 751 and an upper shaft 752. In detail, the upper plate 751 can have a plate shape, and a plate hole 753 through which an end of each of the first upper sub link 73 and the second upper sub link 74 is axially coupled can be defined. One plate hole 753 can be provided in each of both sides, and the first upper sub link 73 and the second upper sub link 74 can be rotatably connected to each other by the shafts 754 and 755.

The upper shaft 752 can extend upward from the upper plate 751 and be provided in a pair, which are spaced apart from each other. The upper shaft 752 can be inserted into the bottom surface of the upper door 20, and the upper door 20 can be coupled to rotate together with the upper link module 70.

The shafts 754 and 755 connecting the upper plate 751, the first upper sub link 73, and the second upper sub link 74 to each other can be provided with washers 756, 756*a*, 757, and 757*a*, and thus, the first upper sub link 73 and the second upper sub link 74 can be stably axially coupled to the upper plate 751.

A sub connection hole 743 can be further defined in the second upper sub link 74. The sub connection hole 743 can be defined between the shaft holes 741 and 742 at each of both ends of the second upper sub link 74, and the second upper sub link 74 can be connected to the upper connection link 72. That is, the shaft 744 passing through the sub connection hole 743 of the second upper sub link 74 can be coupled to pass through the connection hole 726 of the upper connection link 72, and thus, the second upper sub link 74 and the upper connection link 72 can be rotatably coupled to each other.

The upper connection link 72 can be disposed in an inner space of the upper main link 71 to prevent the first upper sub link 73 and the second upper sub link 74 from drooping downward and assist the rotation of the second upper sub link 74.

In detail, one end of the upper connection link 72 can be rotatably connected to the hinge bracket 61 by the sub rotation shaft 63 to extend to an end of the upper main link 71. In some examples, the upper connection link 72 can extend to pass below the first upper sub link 73 and the second upper sub link 74. That is, the upper connection link 72 can be rotatably disposed inside the upper main link 71 to support the first upper sub link 73 and the second upper sub link 74 at the lower side.

A sub rotation shaft hole 721 through which the sub rotation shaft 63 passes can be defined in one end of the upper connection link 72. Thus, the upper connection link 72 can be mounted on the hinge bracket 61 to rotate based on the sub rotation shaft 63.

A connection hole 726 connected to the second upper sub link 74 can be further defined in the upper connection link 72. In some examples, the shaft 744 passing through the sub connection hole 743 of the second upper sub link 74 can be coupled to pass through the connection hole 726. Thus, the second upper sub link 74 can rotate in a state in which the upper main link 71 and the upper connection link 72 are axially coupled to each other. In some examples, the washer 746 penetrated by the shaft 744 can be disposed above the upper connection link 72.

The connection hole 726 can be disposed at an approximately intermediate point of the upper connection link 72. The upper connection link 72 can be constituted by a connection portion 727 and a support portion 728, which extend to left and right sides based on the connection hole 726, as a whole. The connection hole 426 and the sub rotation shaft hole 721 can be defined in the connection portion 727, and thus, each of the upper connection link 72 and the second upper sub link 74 has a rotatable coupling structure. In some examples, the support portion 728 can be disposed to extend to the first upper sub link 73 through at least the second upper sub link 74 and be accommodated in an inner space 710 of the upper main link 71 under the first upper sub link 73 and the second upper sub link 74.

In some examples, an auxiliary supporter 729 can be further provided on one end of the support portion 728. The auxiliary supporter 729 can be mounted on the support portion 728 and be made of a plastic material. For example, the auxiliary supporter 729 can be made of an engineering plastic material or a polyoxymethylene (POM) material having wear resistance and lubricity. For example, the POM material can include polymers or plastic material including acetal, polyacetal, or polyformaldehyde. The auxiliary supporter 729 can be referred to as an upper auxiliary supporter.

An auxiliary supporter mounting portion 728*a* on which the auxiliary supporter 729 is mounted can be disposed to be stepped or recessed in the support portion 728. A protrusion 729*a* can be disposed on a bottom surface of the auxiliary supporter 729, and a groove 728*b* can be defined in the auxiliary supporter mounting portion 728*a*, and thus, the auxiliary supporter 729 can be fixed and mounted to the support portion 728.

In some examples, the auxiliary supporter 729 can protrude more than a top surface of the upper connection link 72 in the state of being mounted on the support portion 728. Thus, the auxiliary supporter 729 can be in contact with a bottom surface of the first upper sub link 73 while the first upper sub link 73 rotates.

The upper link module 70 has a structure in which a plurality of links 72, 73, and 74 are accommodated in an inner space of the upper main link 71 and has a slim structure in the vertical direction to satisfy the total thickness of the link hinge 60. In such a structure, during the operation of the upper link module 70, the first upper sub link 73 or the second upper sub link can structurally droop downward. In some examples, the auxiliary supporter 729 of the upper connection link 72 supports the first upper sub link 73 or the second upper sub link 74 to prevent the first upper sub link 73 or the second upper sub link 74 from drooping downward, thereby preventing the first upper sub link 73 or the second upper sub link 74 from interfering with other components.

In detail, when food is accommodated in the upper door 20, or the upper link module 70 itself is heavy, the upper link module 70 can partially droop. Particularly, while the upper door 20 is opened and closed, the first upper sub link 73 and the second upper sub link 74 can be unfolded, and in this state, the state can be more susceptible to the drooping.

In some examples, even if the first upper sub link 73 or the second upper sub link 74 droops, the first upper sub link 73 and the second upper sub link 74 can be supported by the support portion 725 at the lower side. Particularly, the first upper sub link 73 can be in contact with the auxiliary supporter 729 when the downward drooping occurs during the rotational operation. Thus, the rotation of the first upper sub link 73 can be more smoothly performed. In some examples, when the first upper sub link 73 is supported by the protruding auxiliary supporter 729, the second upper sub link 74 can be naturally maintained in a state of being spaced apart from the upper connection link. Thus, the second upper sub link 74 can rotate smoothly without interfering with the upper connection link 72.

Hereinafter, a structure of the lower link module 80 will be described in more detail with reference to the drawings.

Figure 13:
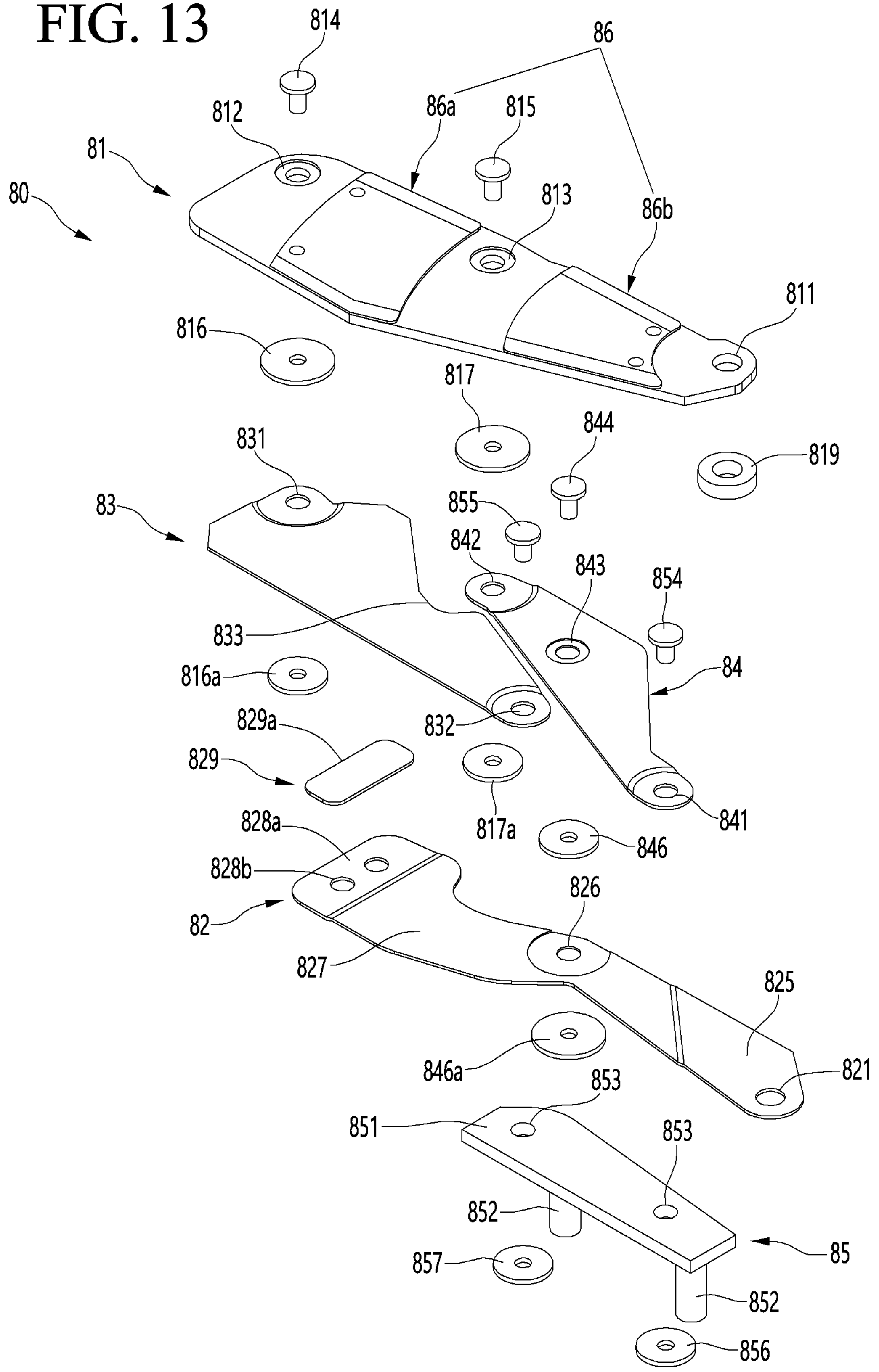
FIG. 13 is an exploded perspective view showing an example of a lower link module of the link hinge.

FIG. 13 is an exploded perspective view of an example of the lower link module of the link hinge.

Referring to the drawings, the lower link module 80 can have the same planar shape as the upper link module 70 as a whole and can have the same structure and shape as the upper link module 70 when viewed from an upper side even in the state of being folded or unfolded.

The lower link module 80 can include the lower main link 81, the first lower sub link 83, the second lower sub link 84, and a lower door bracket 85. In some examples, the first lower sub link 83 and the second lower sub link 84 can be rotatably connected to each other between the lower main link 81 and the door bracket 85. In some examples, the lower link module 80 can further include the lower connection link 82 connecting the second lower sub link 84 to the hinge bracket 61.

Looking at this structure in more detail, the lower main link 81 can be made of a plate-shaped metal material, and like the planar shape of the upper main link 71, the lower main link 81 can have a shape that does not interferes with the hinge bracket 61 and the lower door 30, and the lower door bracket 85 during the rotation. That is, the hinge bracket 61, the lower main link 81, and the lower door bracket 85 can be provided so as not to interfere with each other during the folding or unfolding.

A lower main hole 811 through which the main rotation shaft 62 passes can be defined in one end of the lower main link 81. In some examples, a spacer 817 through which the main rotation shaft 62 passes can be further provided below the lower main hole 811, and thus, the lower main link 81 can be maintained in a state of being spaced apart from the bottom surface of the hinge bracket 61.

In some examples, shaft holes 812 and 813 in which ends of the first lower sub link 83 and the second lower sub link 84 are axially coupled, respectively, can be defined in the lower main link 81. The shafts 814 and 815 can pass through the shaft holes 812 and 813, and the first lower sub link 83 and the second lower sub link 84 can be rotatably coupled to each other. In some examples, at least one washer 816, 816*a*, 817, and 817*a* can be disposed on the shafts 814 and 815. An interval space between the lower main link 81, the first lower sub link 83, and the second lower sub link 84 can be constantly maintained by the washers 816, 816*a*, 817, and 817*a* to secure the smooth rotational operation.

The lower main link 81 can have a plate shape so that a thickness of the lower main link 81 is thinner than that of the upper main link 71. Thus, a thickness of the lower link module 80 itself can be significantly less than that of the upper link module 70. The lower link module 80 can simply fix the upper end of the lower door 30 so that a substantial load of the lower door 30 is supported by the lower hinge 50. Thus, the thickness of the upper link module 70 can be minimized to secure the thickness of the lower link module 80, and the link hinge 60 can have a minimum thickness.

The first lower sub link 83 can have a metal plate shape and can be axially coupled to an end of the lower main link 81 by the shaft 814. In some examples, the first lower sub link 83 can extend to be connected to one side of the lower door bracket 85 and can be rotatably coupled by the lower door bracket 85 and the shaft 855. That is, the first lower sub link 83 can have shaft holes 831 and 832 in both ends thereof, and shafts 814 and 855 can be coupled to the shaft holes 831 and 832 so as to be rotatably coupled to the lower main link 81 and the lower door bracket 85, respectively. In some examples, washers 816, 816*a*, and 857 can be provided on the shaft 814 and 855 to which the first lower sub link 83 is axially coupled to allow the first lower sub link 83 to smoothly rotate.

A portion of an outer portion of a circumferential surface of the first lower sub link 83 can be provided in a linear shape. In some examples, some inner sections of the circumferential surface of the first lower sub link 83 can be tilted or recessed to correspond to the second lower sub link 84. Thus, when the lower link module 80 is fully unfolded, the first lower sub link 83 and the second lower sub link 84 can interfere with each other to complete the rotation of the lower link module 80.

The second lower sub link 84 can have a plate shape made of a metal material, and one end of the second lower sub link 84 can be rotatably mounted to the upper main link 71 by the shaft 815. In some examples, one end of the second lower sub link 84 can be rotatably mounted between the shaft to which the first lower sub link 83 is coupled and the main rotation shaft 62.

In some examples, the second lower sub link 84 can extend to be connected to the lower door bracket 85 and can be rotatably coupled by the lower door bracket 85 and the shaft 854. That is, the second lower sub link 84 can have shaft holes 841 and 842 in both ends thereof, and shafts 815 and 854 can be coupled to the shaft holes 841 and 842 so as to be rotatably coupled to the lower main link 81 and the lower door bracket 85, respectively. In some examples, washers 817, 817*a*, and 856 can be provided on the shaft 815 and 854 to which the second lower sub link 84 is axially coupled to allow the second lower sub link 84 to smoothly rotate.

Each of ends of the first lower sub link 83 and the second lower sub link 84 can be connected to the lower door bracket 85. The lower door bracket 85 can be connected to the top surface of the lower door 30 to connect the lower link module 80 to the lower door 30.

The lower door bracket 85 can be made of a metal material and include a plate-shaped lower plate 851 and a lower shaft 852. In detail, the lower plate 851 can have a plate shape, and a plate hole 853 through which an end of each of the first lower sub link 83 and the second lower sub link 84 is axially coupled can be defined. One plate hole 853 can be provided in each of both sides, and the first lower sub link 83 and the second lower sub link 84 can be rotatably connected to each other by the shafts 854 and 855.

The lower shaft 852 can extend downward from the lower plate 851 and be provided in a pair, which are spaced apart from each other. The lower shaft 852 can be inserted into the bottom surface of the lower door 30, and the lower door 30 can be coupled to rotate together with the lower link module 80.

The shafts 854 and 855 connecting the lower plate 851, the first lower sub link 83, and the second lower sub link 84 to each other can be provided with at least one or more washers 856 and 857, and thus, the first lower sub link 83 and the second lower sub link 84 can be stably axially coupled to the lower plate 851.

A sub connection hole 843 can be further defined in the second lower sub link 84. The sub connection hole 843 can be defined between the shaft holes 841 and 842 at each of both ends of the second lower sub link 84, and the second lower sub link 84 can be connected to the lower connection link 82. That is, the shaft 844 passing through the sub connection hole 843 of the second lower sub link 84 can be coupled to pass through the connection hole 826 of the lower connection link 82, and thus, the second lower sub link 84 and the lower connection link 82 can be rotatably coupled to each other.

The lower connection link 82 can be disposed under the first lower sub link 83 and the second lower sub link 84 to prevent the first lower sub link 83 and the second lower sub link 84 from drooping downward and assist the rotation of the second lower sub link 84.

In detail, one end of the lower connection link 82 can be rotatably connected to the hinge bracket 61 by the sub rotation shaft 63 to extend to an end of the lower main link 81. In some examples, the lower connection link 82 can extend to pass below the first lower sub link 83 and the second lower sub link 84. That is, the lower connection link 82 can be rotatably disposed inside the lower main link 81 to support the first lower sub link 83 and the second lower sub link 84 at the lower side.

A sub rotation shaft hole 821 through which the sub rotation shaft 63 passes can be defined in one end of the lower connection link 82. Thus, the lower connection link 82 can be mounted on the hinge bracket 61 to rotate based on the sub rotation shaft 63.

A connection hole 826 connected to the second lower sub link 84 can be further defined in the lower connection link 82. In some examples, the shaft 844 passing through the sub connection hole 843 of the second lower sub link 84 can be coupled to pass through the connection hole 826. Thus, the second lower sub link 84 can rotate in a state in which the lower main link 81 and the lower connection link 82 are axially coupled to each other. The connection hole 826 can be disposed at an approximately intermediate point of the lower connection link 82. In some examples, the washers 846 and 846*a* penetrated by the shaft 844 can be disposed above and below the lower connection link 82.

A sub rotation shaft hole 821 through which the sub rotation shaft 63 passes can be defined in an end of the first connection portion 825. Thus, the lower connection link 82 can rotate about the sub rotation shaft 63 in the hinge bracket 61.

In some examples, a connection hole 826 can be defined in the second connection portion 827, and thus the second lower sub link 84 has a rotatable coupling structure. Thus, the lower connection link 82 and the second lower sub link 84 are rotatable with each other around the shaft 844.

The second connection portion 827 can extend to the first lower sub link 83 via the second lower sub link 84 to support the first lower sub link 83 under the first lower sub link 83 and the second lower sub link 84.

An auxiliary supporter 829 can be further provided at one end of the second connection portion 827. The auxiliary supporter 829 can be mounted on an end of the second connection portion 828 and be made of a plastic material. For example, the auxiliary supporter 829 can be made of an engineering plastic material or a POM material having wear resistance and lubricity. The auxiliary supporter 829 can be referred to as a lower auxiliary supporter.

An auxiliary supporter mounting portion 828*a* on which the auxiliary supporter 829 is mounted can be disposed to be stepped or recessed in the second connection portion 827. A protrusion 829*a* can be disposed on a bottom surface of the auxiliary supporter 829, and a groove 828*b* can be defined in the auxiliary supporter mounting portion 828*a*. Thus, the protrusion 829*a* and the groove 828*b* can be coupled to each other so that the auxiliary supporter 829 is fixed to the auxiliary supporter mounting portion 828*a*.

In some examples, the auxiliary supporter 829 can protrude more than a top surface of the upper connection link 72 in the state of being mounted on the second connection portion 827. Thus, the auxiliary supporter 829 can be in contact with a bottom surface of the first lower sub link 83 while the first lower sub link 83 rotates.

The lower link module 80 can have a thin plate-like structure to satisfy a total thickness of the link hinge 60. In such a structure, during the operation of the lower link module 80, the first lower sub link 83 or the second lower sub link 84 can structurally droop downward. In some examples, the auxiliary supporter 829 of the lower connection link 82 supports the first lower sub link 83 or the second lower sub link 84 to prevent the first lower sub link 83 or the second lower sub link 84 from drooping downward, thereby preventing the first lower sub link 83 or the second lower sub link 84 from interfering with other components.

In detail, when a heavy object is accommodated in the lower door 30 or an excessive downward load is applied, the lower link module 80 can partially droop. Particularly, while the lower door 30 is opened and closed, the first lower sub link 83 and the second lower sub link 84 can be unfolded, and in this state, the state can be more susceptible to the drooping.

In some examples, even if the first lower sub link 83 and the second lower sub link 84 droop, the first lower sub link and the second lower sub link can be supported by the second connection portion at the lower side. Particularly, the first lower sub link 83 can be in contact with the auxiliary supporter 829 when the downward drooping occurs during the rotational operation. Thus, the rotation of the first lower sub link 83 can be more smoothly performed. In some examples, when the first lower sub link 83 is supported by the protruding auxiliary supporter 829, the second lower sub link 84 can be naturally maintained in a state of being spaced apart from the lower connection link 82. Thus, the second lower sub link 84 can rotate smoothly without interfering with the lower connection link 82.

A pair of supporters 86 can be provided on the top surface of the lower main link 81. The supporter 86 can support the upper link module 70 so as not to be hooked and restricted by the lower link module 80 even if the downward drooping occurs during the rotational operation of the upper link module 70. In some examples, the supporter 86 can be made of engineering plastic or POM material having abrasion resistance and lubricity. Then, when the upper link module 70 is in contact with the supporter 86, the upper link module 70 may not be hooked, but smoothly rotate.

Hereinafter, the supporter 86 will be described in more detail with reference to the drawing.

Figure 14:
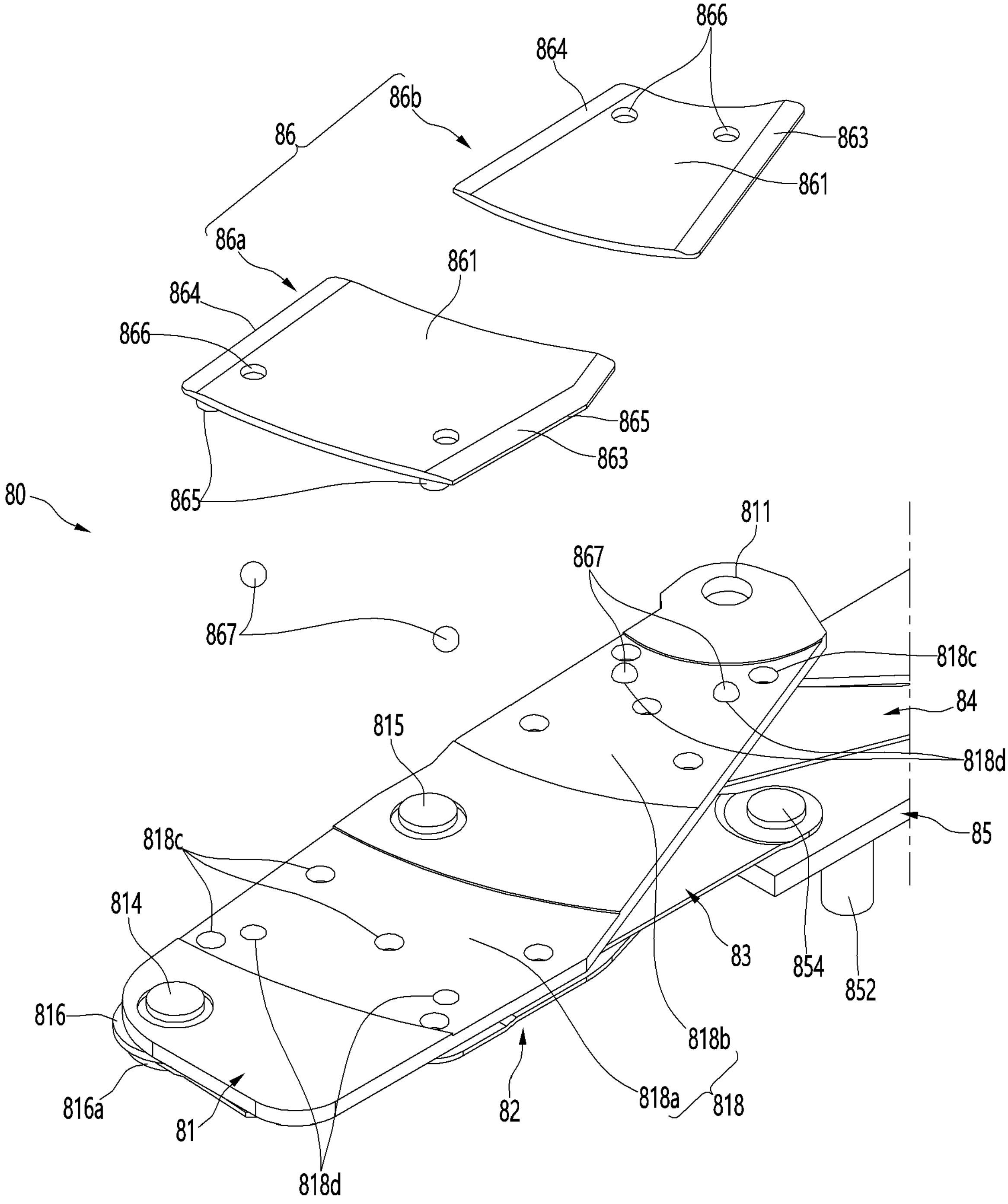
FIG. 14 is an exploded perspective view illustrating an example a supporter provided on the lower link module viewed from an upper side.
Figure 15:
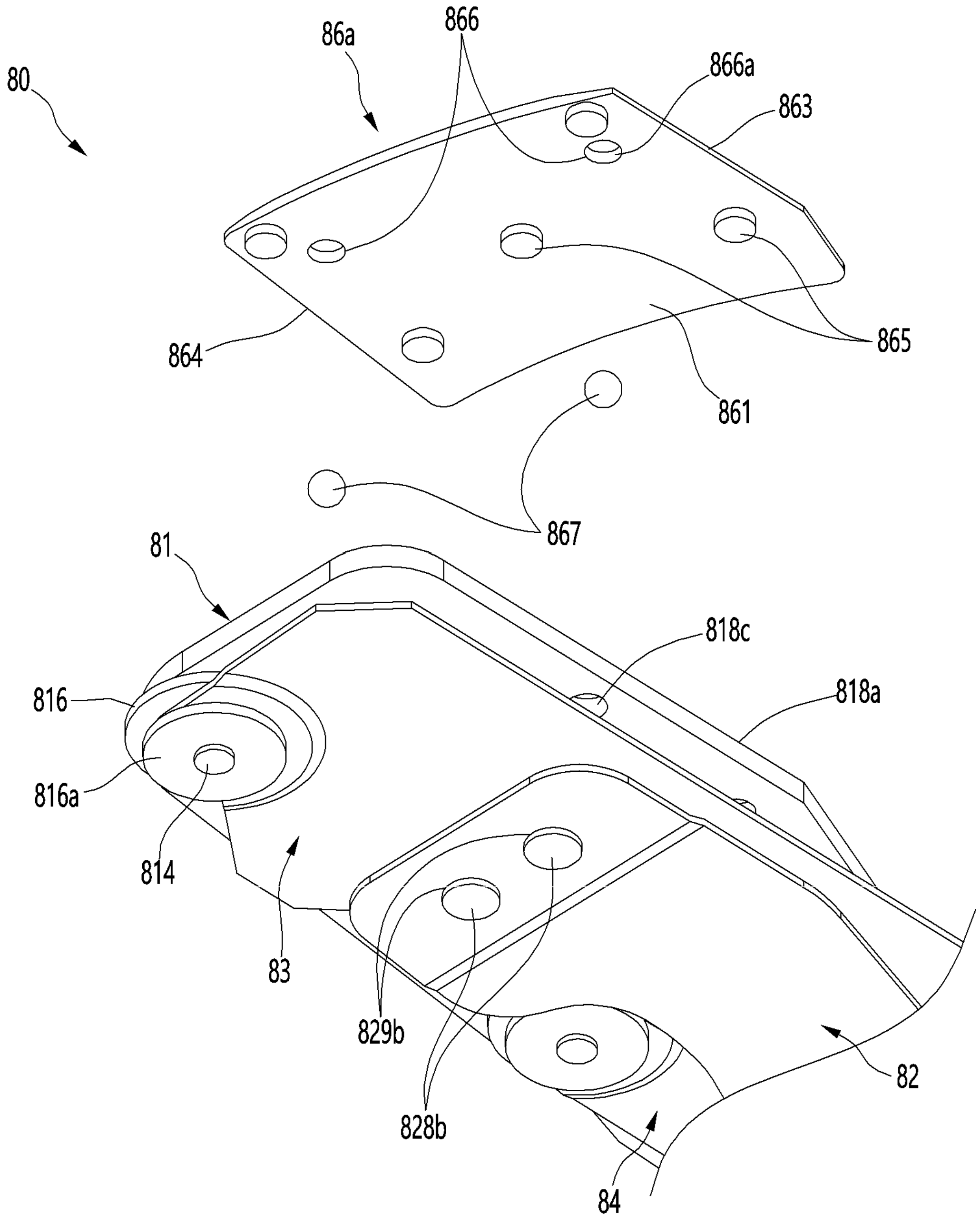
FIG. 15 is an exploded perspective view illustrating the supporter provided on the lower link module viewed from the lower side.
Figure 16:
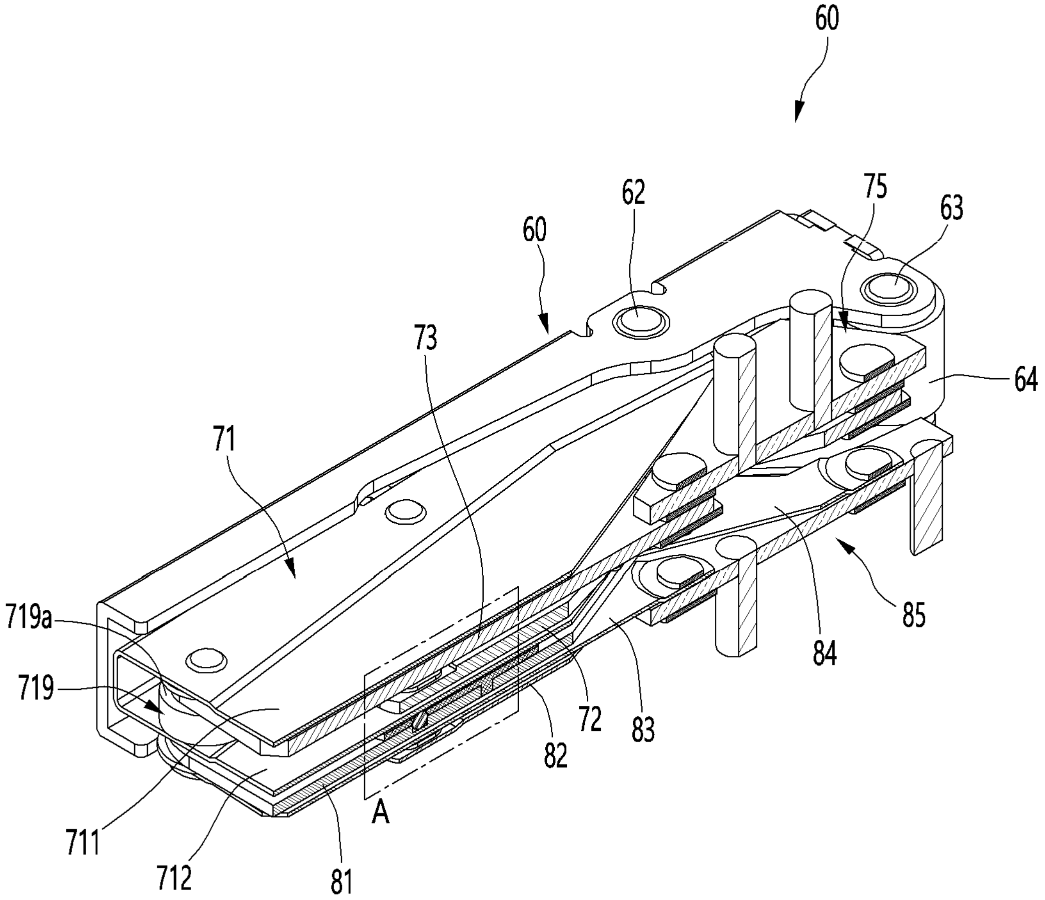
FIG. 16 is a cutaway perspective view taken along line XVI-XVI' of FIG. 8.
Figure 17:
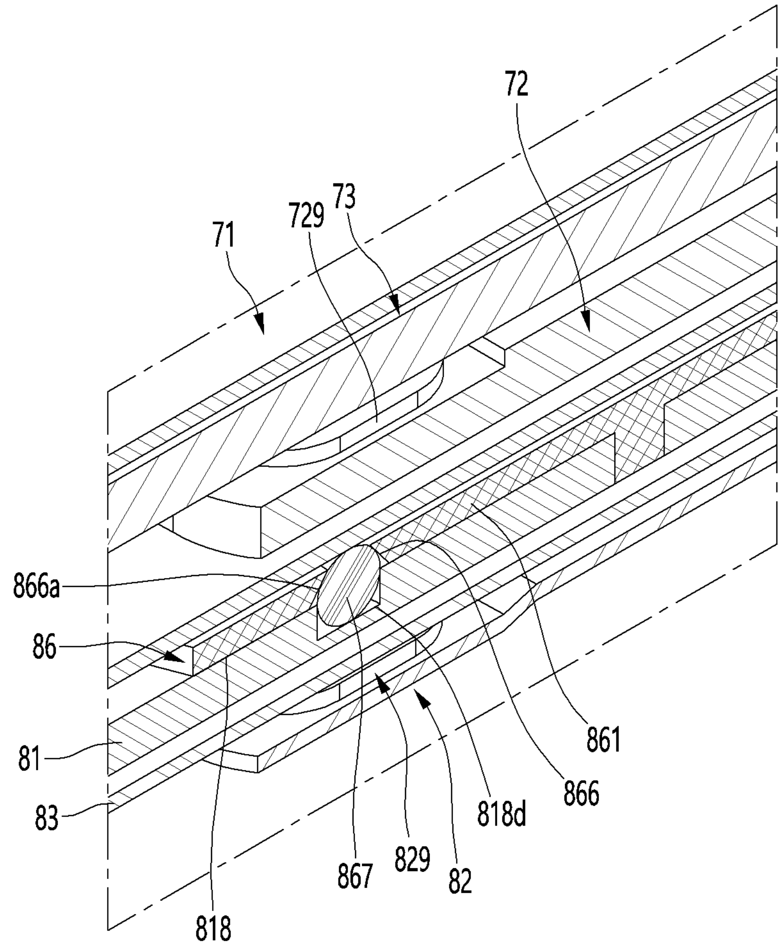
FIG. 17 is an enlarged view illustrating portion A of FIG. 16.
Figure 18:
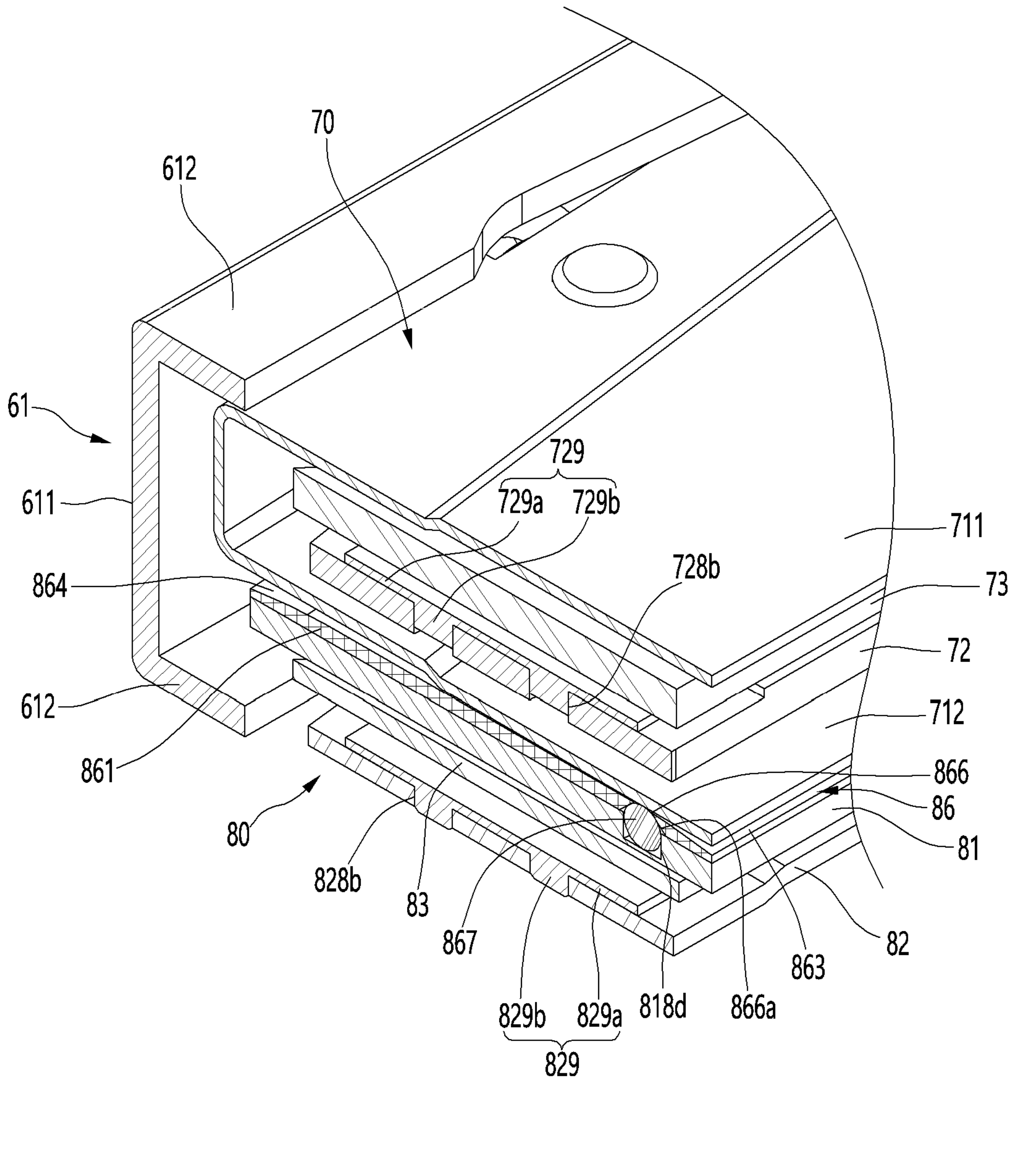
FIG. 18 is a cutaway perspective view taken along line XVIII-XVIII' of FIG. 8.

FIG. 14 is an exploded perspective view illustrating an example of the supporter provided on the lower link module viewed from the upper side. FIG. 15 is an exploded perspective view illustrating the supporter provided on the lower link module viewed from the lower side. FIG. 16 is a cutaway perspective view taken along line XVI-XVI' of FIG. 8. FIG. 17 is an enlarged view illustrating portion A of FIG. 16. FIG. 18 is a cutaway perspective view taken along line XVIII-XVIII' of FIG. 8.

As shown in the drawings, the supporter 86 can be mounted on a top surface of the lower main link 81. The supporter 86 can be provided in plurality. For example, two supporters 86 can be provided along the lower main link 81 and can include a first supporter 86*a* and a second supporter 86*b*. The first supporter 86*a* and the second supporter 86*b* differ only in size and mounting position, but can have the same overall configuration. Therefore, a detailed description of the second supporter 86*b* will be omitted.

The supporter 86 can have a plate shape and can be mounted on a supporter mounting portion 818 disposed on the top surface of the lower main link 81. The supporter 86 can be made of a plastic material having abrasion resistance and lubricity and can be firmly coupled to the top surface of the lower main link 81 made of a metal material.

The supporter mounting portion 818 can have a shape corresponding to the supporter 86 and can be recessed. In some examples, the supporter mounting portion 818 can include a first supporter mounting unit 818*a* to which the first supporter 86*a* is mounted and a second supporter mounting unit 818*b* to which the second supporter 86*b* is mounted.

The supporter 86 can be seated and fixed inside the supporter mounting portion 818. In detail, a plurality of supporter coupling protrusions 865 protruding downward are disposed on a bottom surface of the supporter 86, and the supporter mounting portion 818 corresponding to the position of the supporter coupling protrusion 865 can be provided with a supporter coupling hole 818*c* into which the supporter coupling protrusion A is inserted. Thus, the supporter 86 can be rigidly fixedly mounted to the lower main link 81.

The bottom surface of the supporter 86 can be in close contact with an inner surface of the supporter mounting portion 818, and the top surface of the supporter 86 can protrude more upward than the top surface of the lower main link 81. Thus, when the upper link module 70 droops downward, the bottom surface of the upper link module 70 is supported to be in contact with the top surface of the supporter 86, but is not in contact with other lower components including the lower main link 81.

The top surface of the supporter 86 protruding upward from the lower main link 81 can include an intermediate portion 861, a front guide portion 863, and a rear guide portion 864. In detail, the intermediate portion 861 can define most of the top surface of the supporter 86 and can define a space between the front guide portion 863 and the rear guide portion 864. The intermediate portion 861 can define a protruding top surface of the supporter 86 and can have a planar shape having the same height.

In some examples, the front guide portion 863 can extend forward from a front end of the intermediate portion 861 and can define a front end of the supporter 86. The front guide portion 863 can be tilted or rounded so that a height thereof decreases as extending forward.

In some examples, the rear guide portion 864 can extend backward from a rear end of the intermediate portion 861 and can define a rear end of the supporter 86. The rear guide portion 864 can be tilted or rounded so that a height thereof decreases as extending backward.

Thus, while the upper link module 70 or the lower link module 80 rotates, a bottom surface of the upper link module 70 can start to be in contact with the front guide portion 863 or the rear guide portion 864 so as to move to the intermediate portion 861. That is, the upper link module 70 can smoothly move in the contact state as the contact starts along the tilted or rounded portion of each of the front guide portion 863 and the rear guide portion 864.

A horizontal width of the supporter 86 can be equal to a horizontal width of the lower main link 81. That is, a front end of the supporter 86 can be disposed at a position corresponding to the front end of the lower main link 81 and have the same shape as the front end of the lower main link 81. In some examples, a rear end of the supporter 86 can be disposed at a position corresponding to the rear end of the lower main link 81 and have the same shape as the rear end of the lower main link 81. In some examples, in the supporter 86, a plurality of first supporters **86*a* and second supporters 86*b* can be disposed along the lower main link 81**.

Thus, the upper link module 70 can be maintained in state of being in contact with the supporter 86 without being in contact with the lower main link 81 at any position during the operation. Particularly, at the moment at which the bottom surface of the upper link module 70 passes through a position corresponding to the front end or the rear end of the lower main link 81, the contact of the supporter 86 with the front guide portion 863 or the rear guide portion 864 can start to secure the smooth operation of each of the upper link module 70 and the lower link module 80.

A supporting ball 867 can be provided on the supporter 86. The supporting ball 867 can be mounted on the supporter 86 in the same structure as a ball bearing. The supporting ball 867 can be in contact with the bottom surface of the upper link module 70 so that the upper link module 70 moves more smoothly in the contact state.

The supporting ball 867 can be provided in plurality on the supporter 86. The supporting balls 867 can be spaced apart from each other in all directions, and the upper link module 70 can be maintained in contact state while passing through the supporter 86.

The supporting ball 867 can be disposed on a boundary line between the front guide portion 863 and the intermediate portion 861 and on a boundary line between the rear guide portion 864 and the intermediate portion 861. That is, the supporting ball 867 can be provided at the front and rear ends of the intermediate portion 861 to support the upper link module 70 passing through the front guide portion 863 or the rear guide portion 864. Thus, the upper link module 70 can move more naturally in contact with and in the contact state with the supporter 86 having the protruding structure.

The supporting ball 867 can be provided between the supporter mounting portion 818 and the supporter 86, and at least a portion can be configured to protrude upward through the top surface of the supporter 86.

In detail, an accommodation groove **818*d* recessed downward can be defined in the supporter mounting portion 818. The accommodation groove 818*d* can be defined to accommodate the supporting ball 867. The supporting ball 867 can rotate while being accommodated in the accommodation groove 818*d*, and at least a portion can protrude above the accommodation groove 818*d***.

In addition, a supporter opening 866 can be defined in the supporter 86. The supporter opening 866 can be defined at a position facing the accommodation groove **818*d*. In addition, an inner diameter of the supporter opening 866 can be less than that of the supporting ball 867. In some examples, the supporter opening 866 can accommodate a portion of an upper portion of the supporting ball 867, and a portion of the supporting ball 867 can protrude upward through the supporter opening 866. The supporter opening 866 can be defined to have a narrower diameter as it goes upward, and thus an inner surface of the supporter opening 866 can surround an outer surface of the supporting ball 867 so that the supporting ball 867** does not move, but rotate in a stable state.

In some examples, the supporting ball 867 can be maintained in a state accommodated in a space between the supporter opening 866 and the accommodation groove **818*d*. In some examples, an upper end of the supporting ball 867 protruding upward of the supporter 86 can rotate in a state of being in contact with the bottom surface of the upper link module 70. That is, the supporting ball 867 can be in contact with the upper link module 70 in a rotatable state to support the upper link module 70 from the lower side so that the upper link module 70** moves more smoothly.

In detail, as illustrated in FIGS. 17 and 18, the supporting ball 867 can be in contact with the bottom surface of the upper main link 71 of the upper link module 70. Therefore, when the upper link module 70 rotates, or the lower link module 80 rotates, the supporting ball 867 can rotate in a state of being in contact with the bottom surface of the upper main link 71 to be moved.

In some examples, even if the upper link module 70 slightly droops downward by the load of the upper door 20, the operation of the upper link module 70 and the upper link module 70 can be performed without interference therebetween by the supporting ball 867 and the supporter 86.

In some examples, the weight of the upper door 20 can be light, or at the initial installation of the refrigerator 1, the upper link module 70 can be in a state in which the dropping may not occur relatively, and in the state in which the upper link module 70 may not droop, the supporting ball 867 and the upper link module 70 can be in a non-contact state.

Hereinafter, a state of the link hinge 60 according to the opened and closed state of the upper door 20 and the lower door 30 will be described with reference to the drawings.

Figure 19:
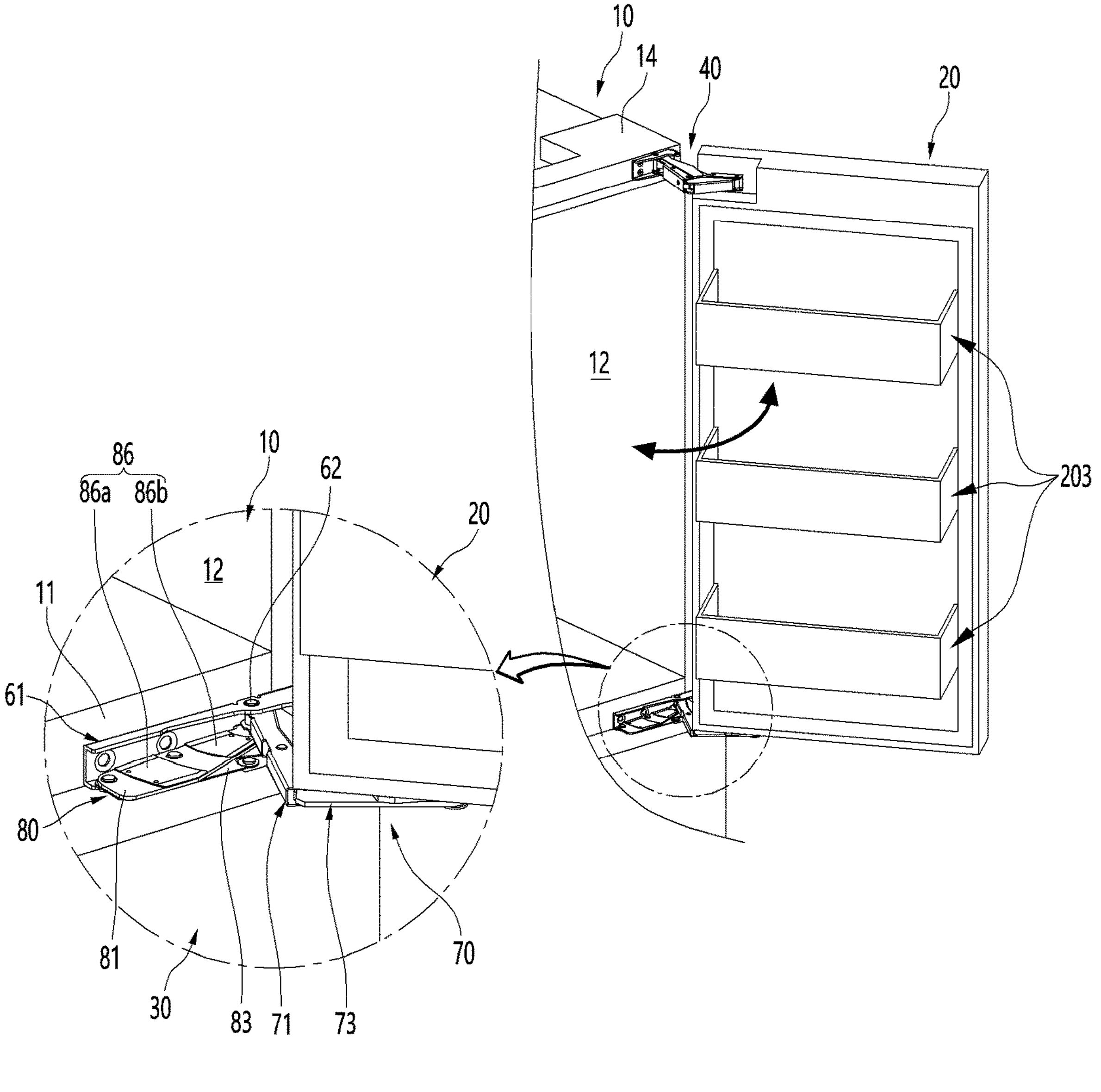
FIG. 19 is a view illustrating an example state of the link hinge when the upper door is opened.
Figure 20:
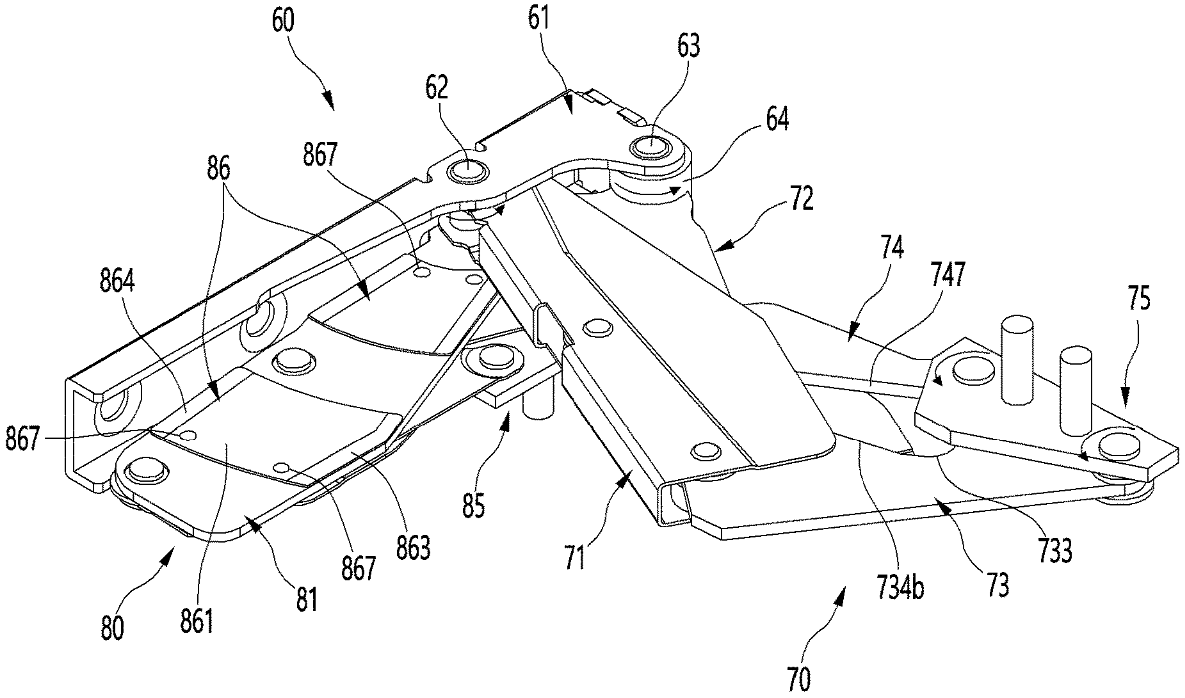
FIG. 20 is a perspective view illustrating an example state of the upper link module that is rotated.
Figure 21:
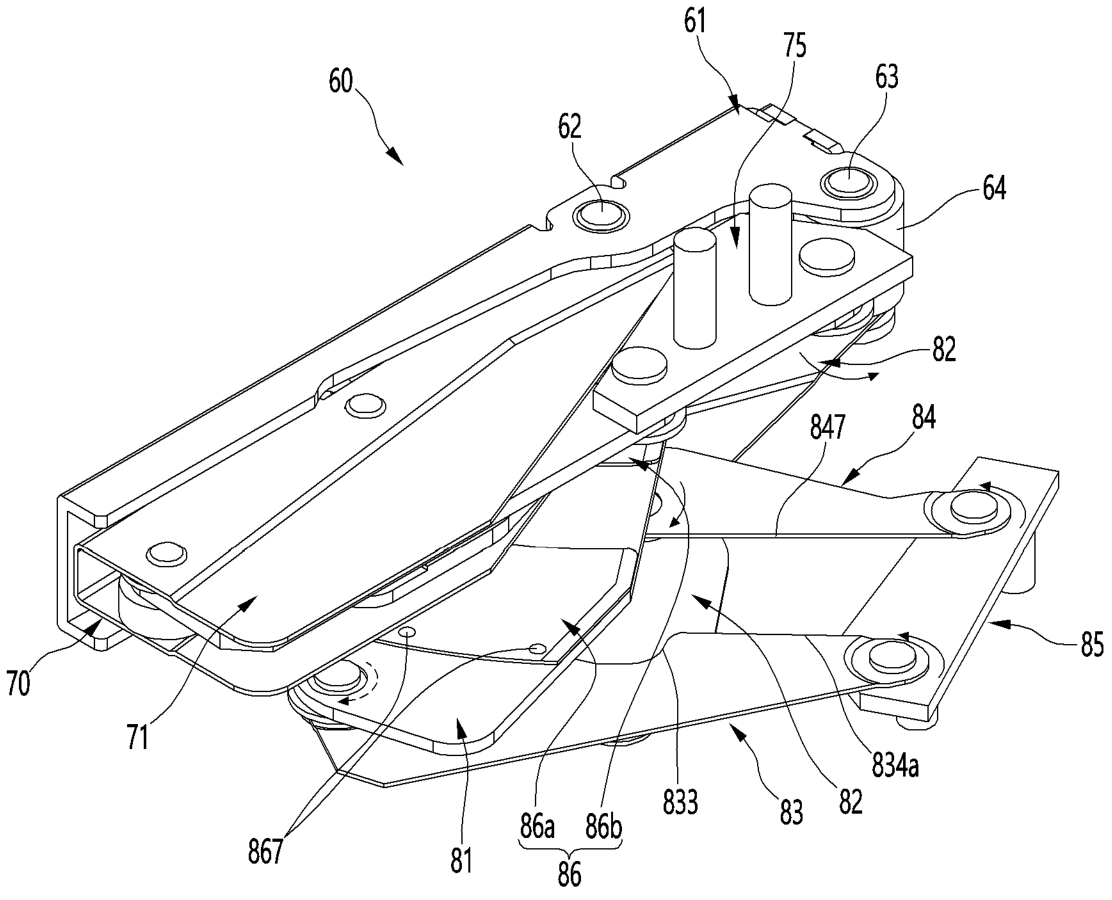
FIG. 21 is a perspective view illustrating an example state of the lower link module that is rotated.

FIG. 19 is a view illustrating a state of the link hinge in a state in which the upper door is opened. In some examples, FIG. 20 is a perspective view illustrating a state in which the upper link module rotates. In some examples, FIG. 21 is a perspective view illustrating a state in which the lower link module rotates.

Referring to the drawings, as illustrated in FIG. 1, when both the upper door 20 and the lower door 30 are closed, the user can open the upper door 20 by rotating as illustrated in FIG. 19.

When the user opens the upper door 20, the upper link module 70 starts to rotate. In some examples, according to the rotation operation of the upper door 20, the upper link module 70 can operate from the fully folded state of FIG. 5 to the unfolded state of FIG. 16.

In detail, according to the user's manipulation for the upper door 20, the upper hinge 40 and the upper link module 70 of the link hinge 60 operate, and the upper door 20 can rotate together along the rotational trajectory of the upper link module 70 of the link hinge 60 and then be opened.

In some examples, the upper link module 70 operates in a state of supporting the upper door 20 from the lower side. The upper link module 70 can be unfolded while rotating until the upper door 20 starts to rotate and is fully opened.

That is, the upper main link 71 can rotate in a counter-clockwise direction with respect to the main rotation shaft 62 together with the opening of the upper door 20, and the upper connection link 72 can start to rotate in a counter-clockwise direction with respect to the sub rotation shaft 63. In some examples, ends of the first upper sub link 73 and the second upper sub link 74 connected to the upper main link 71 start to rotate in a clockwise direction. In some examples, the door bracket 75 connected to the other ends of the first upper sub link 73 and the second upper sub link 74 rotates in the counterclockwise direction.

In some examples, in the state in which the upper main link 71, the first upper sub link 73, and the second upper sub link 74 can be disposed inside the upper main link 71, and the upper main link 71, the first upper sub link 73, and the second upper sub link 74 can rotate while moving together with the upper main link 71. In some examples, the upper connection link 72 can be disposed under the first upper sub link 73 and the second upper sub link 74 to support the first upper sub link 73 and the second upper sub link 74, thereby preventing the first upper sub link 73 and the second upper sub link 74 from drooping.

The upper link module 70 can be configured to rotate while the upper door 20 moves away from the front of the cabinet 10, and due to this structural feature, when the upper door 20 starts to be opened, the upper link module 70 can slightly droop downward.

However, the upper link module 70 can be supported from the lower side by the supporter 86 and can rotate without interfering with the lower link module 80. That is, while the upper main link 71 rotates, the upper main link 71 can be maintained in a supported state by the supporting ball 867 and the supporter 86, and the smooth rotation operation of the upper main link 71 can be ensured.

When the user manipulates the upper door 20 to be opened, the upper link module 70 starts to rotate. In some examples, according to the rotation operation of the lower door 30, the lower link module 80 can operate from the fully folded state of FIG. 17 to the unfolded state while rotating as illustrated FIG. 18.

In detail, according to the user's manipulation for the lower door 30, the lower hinge 50 and the lower link module 80 of the link hinge 60 operate, and the lower door 30 can rotate together along the rotational trajectory of the lower link module 80 of the link hinge 60 and then be opened.

In some examples, the lower link module 80 operates in a state of connecting the lower door 30 from the upper side. The lower link module 80 can be unfolded while rotating until the lower door 30 starts to rotate and is fully opened.

That is, the lower main link 81 can rotate in a counter-clockwise direction with respect to the main rotation shaft 62 together with the opening of the lower door 30, and the lower connection link 82 can start to rotate in a counter-clockwise direction with respect to the sub rotation shaft 63. In some examples, ends of the first lower sub link 83 and the second lower sub link 84 connected to the lower main link 81 start to rotate in a clockwise direction. In some examples, the lower door bracket 85 connected to the other ends of the first lower sub link 83 and the second lower sub link 84 rotates in the counterclockwise direction.

In some examples, in the state in which the lower main link 81, the first lower sub link 83, and the second lower sub link 84 can be disposed inside the lower main link 81, and the lower main link 81, the first lower sub link 83, and the second lower sub link 84 can rotate while moving together with the lower main link 81. In some examples, the lower connection link 82 can be disposed under the first lower sub link 83 and the second lower sub link 84 to support the first lower sub link 83 and the second lower sub link 84, thereby preventing the first lower sub link 83 and the second lower sub link 84 from drooping.

While the lower main link 81 and the lower connection link 82 continuously rotate according to the open rotation of the lower door 30, the first lower sub link 83 and the second lower sub link 84 also rotate together.

While the lower link module 80 is operating, the upper link module 70 can be in a slightly dropping state due to the weight of the upper door 20. However, the upper link module 70 is supported from below by the supporter 86 so as not to interfere with the lower link module 80.

Accordingly, even while the lower link module 80 rotates, the interference with the upper link module 70 can be prevented, and the smooth rotation operation of the lower main link 81 can be ensured.

In some examples, a process of closing the upper door 20 and the lower door 30 can be performed in a reverse order of the above-described opening process, and similarly, the supporter 86 can support the upper link module 70 from the lower side to provide the upper link so that the upper link module 70 and the lower link module 80 smoothly operate.

In some implementations, only a combination of the upper link module and the lower link module constituting the link hinge may be different, but other detailed configuration may be the same. Thus, the same components are denoted using the same reference numerals or detailed descriptions thereof will be omitted to prevent duplication of description.

Figure 22:
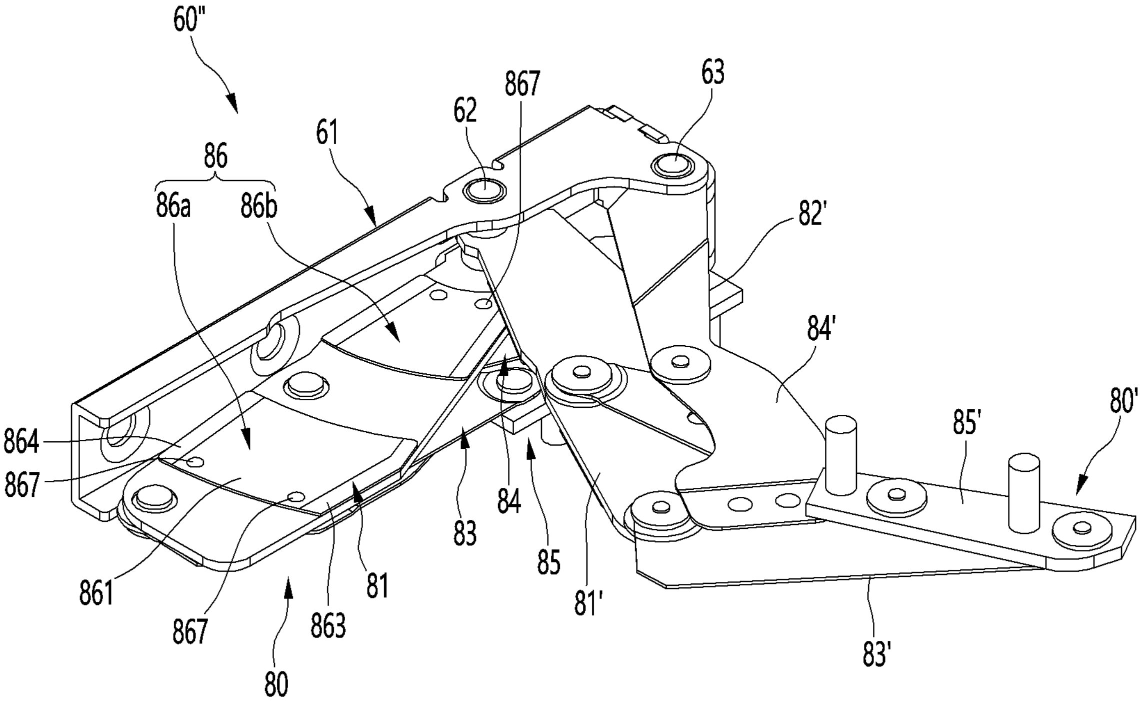
FIG. 22 is a perspective view illustrating an example of a link hinge.

FIG. 22 is a perspective view showing an example of a link hinge.

As illustrated in the drawing, a link hinge 60' can include a hinge bracket 61 fixed and mounted to a cabinet 10, and an upper link module 80' and a lower link module 80, which are vertically disposed inside the hinge bracket 61. In some examples, a structure and shape of the hinge bracket 61 and the lower link module 80 can be similar or completely the same as those of the above-described implementations.

In detail, the hinge bracket 61 can have the same structure as the hinge bracket 61 according to the foregoing implementation. The hinge bracket 61 can have an accommodation space in which all the upper link module 80' and the lower link module 80 are accommodated. Each of the upper link module 80' and the lower link module 80 can have a plate shape, and a vertical thickness of the hinge bracket 61 can be thinner than that according to the forgoing implementation.

For instance, when the thickness of the hinge bracket 61 is thinner, a link hinge 60" can be more compact. Thus, a thickness of the barrier 11 can be thinner, and an interval between an upper door 20 and a lower door 30 can be narrower to improve an outer appearance.

The lower link module 80 can include a lower main link 81, a lower connection link 82, a first lower sub link 83, a second lower sub link 84, a lower door bracket 85, and a supporter, which are the same as those according to foregoing implementation.

In some examples, the upper link module 80' can have the same structure the lower link module 80 except for the supporter 86. That is, the upper link module 80' can also include an upper main link 81' having a plate-shaped structure like the lower link module 80, and a first upper sub link 83' coupled to the upper main link 81', a second upper sub link 84', and an upper connection link 82'. These configurations can differ only in their names, and can have the same shape as the lower main link 81, the first lower sub link 83, the second lower sub link 84, and the lower connection link 82, respectively.

However, since the upper link module 80' has to be connected to a bottom surface of the upper door 20, an upper shaft of the upper door bracket 85' can be disposed to face an upper side.

In addition to the foregoing implementation, a refrigerator according to various implementations can be exemplified.

Hereinafter, the refrigerator will be described in more detail with reference to the accompanying drawings.

In some implementations, the link hinge 600, only a combination of the upper link module and the lower link module constituting the multi-joint link hinge is different, but other detailed configuration can be the same or similar to the foregoing implementations.

Figure 23:
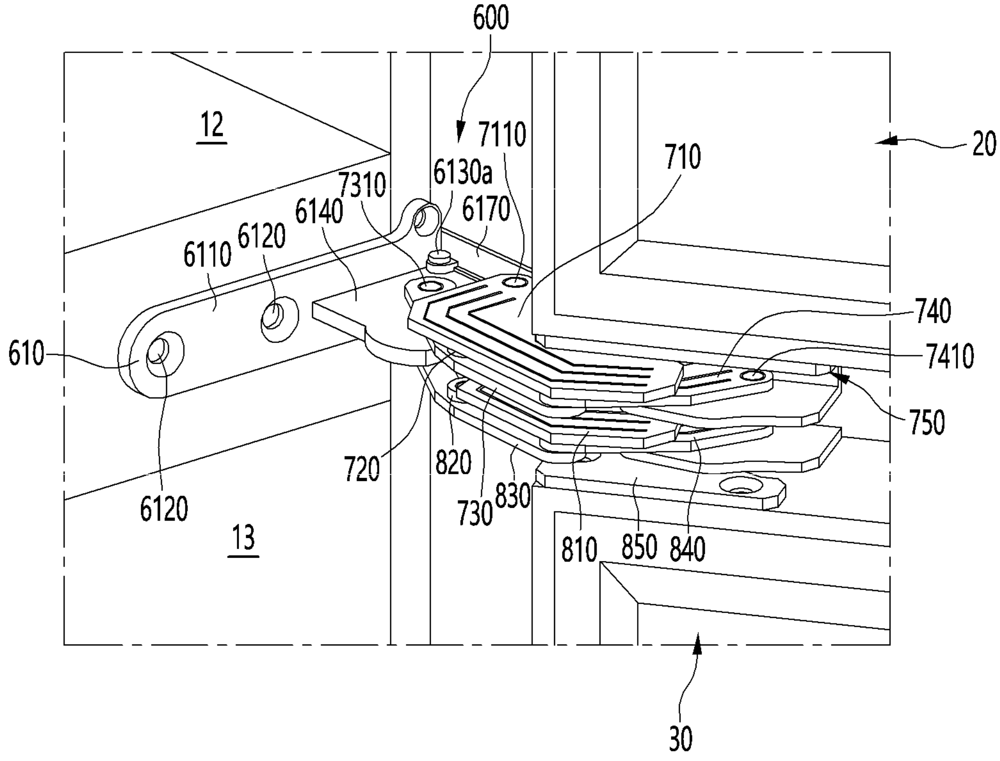
FIG. 23 is a view illustrating an example of a link hinge.
Figure 24:
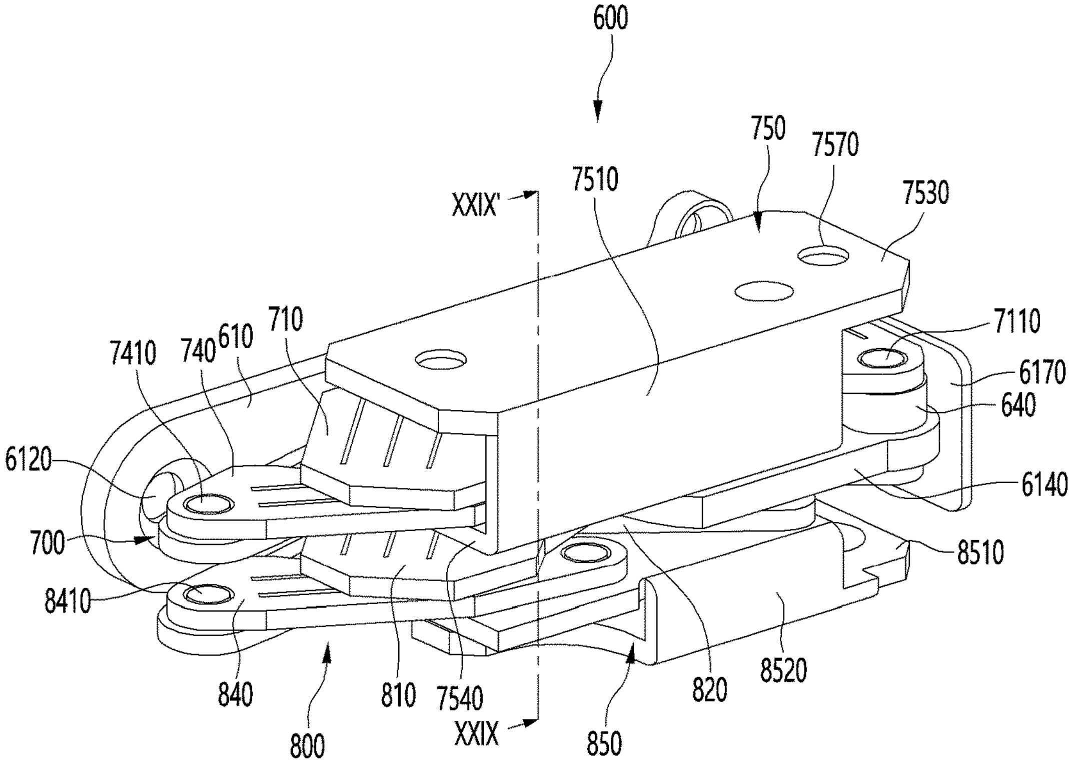
FIG. 24 is a perspective view showing the link hinge in FIG. 23.
Figure 25:
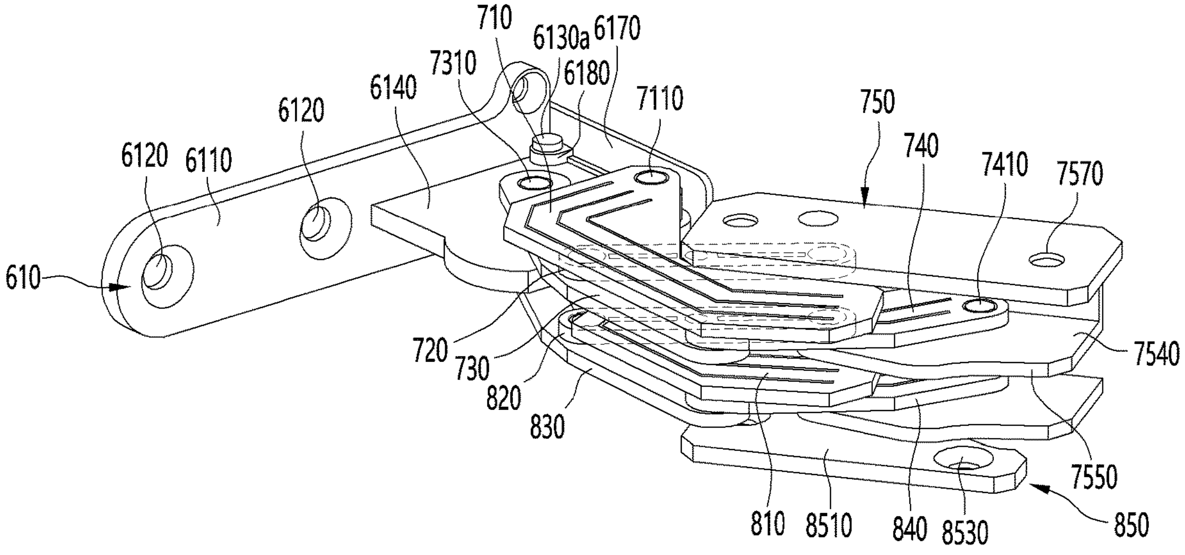
FIG. 25 is a perspective view illustrating an example state of the link hinge in FIG. 23 in an unfolded state at a predetermined angle.
Figure 26:
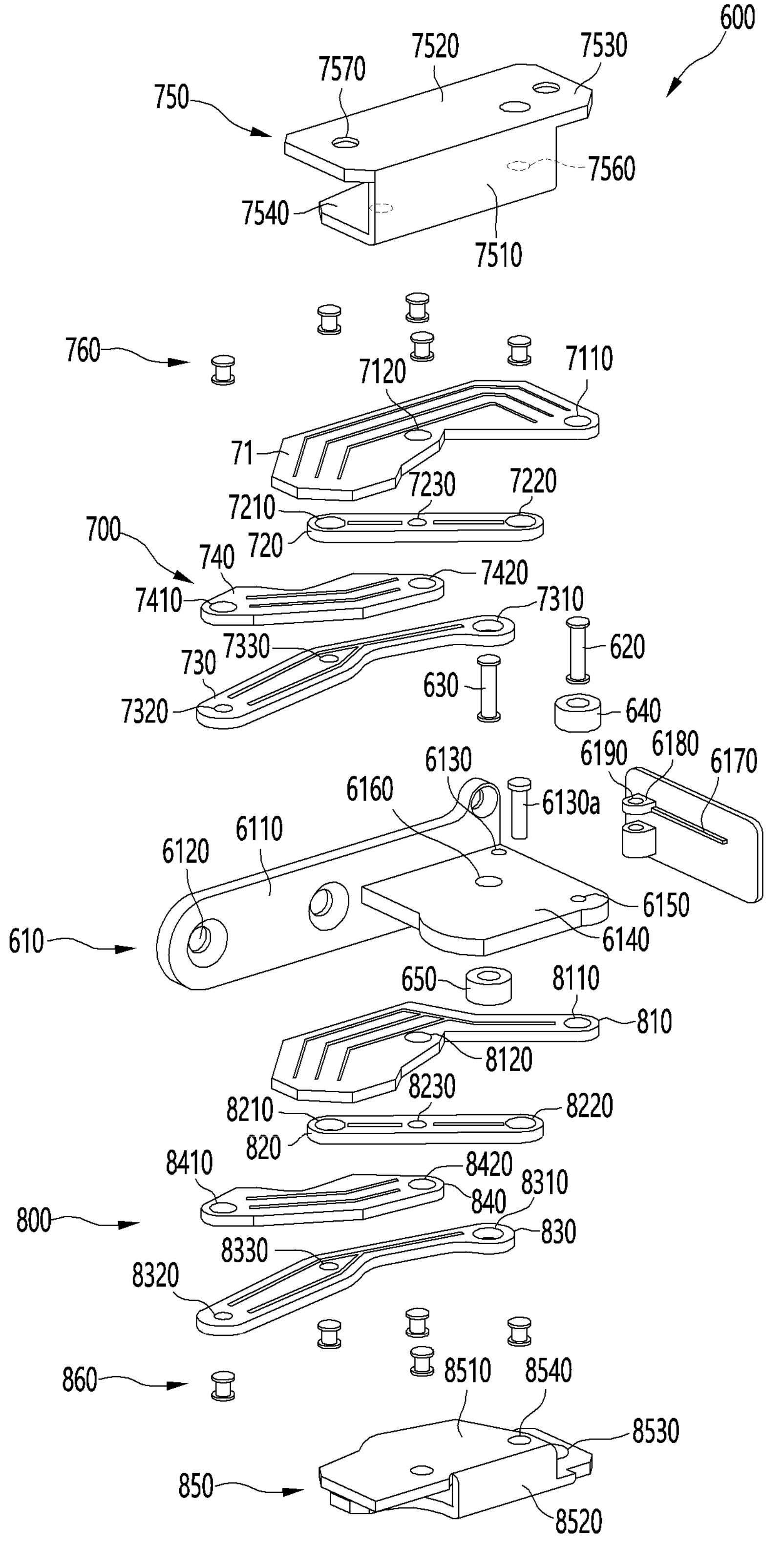
FIG. 26 is an exploded perspective view illustrating the link hinge in FIG. 23.

FIG. 23 is a view of an example of a link hinge. In some examples, FIG. 24 is a perspective view of the link hinge in FIG. 23. In some examples, FIG. 25 is a perspective view illustrating the link hinge in FIG. 23 in an unfolded state at a predetermined angle. In some examples, FIG. 26 is an exploded perspective view illustrating the link hinge in FIG. 23.

As illustrated in the drawings, the link hinge 600 rotatably supports the upper door 20 and the lower door 30. Thus, the link hinge 600 can be disposed between the upper door 20 and the lower door 30. In detail, the link hinge 600 can be disposed in a space between the bottom surface of the upper door 20 and the top surface of the lower door 30 and can be mounted on the front surface of the cabinet 10.

The link hinge 600 can be mounted on a front surface of the barrier 11 and be connected to the bottom surface of the upper door 20 and the top surface of the lower door 30, respectively, so that the upper door 20 and the lower door 30 rotate independently.

That is, the link hinge 600 includes a hinge bracket 61 mounted on the barrier 11 and a plurality of links axially coupled to the hinge bracket 61.

In detail, the link hinge 600 is axially coupled to the hinge bracket 61 and includes an upper link module 700 and a lower link module 800 including a plurality of plate-shaped links. The upper link module 700 can be coupled to a bottom surface of the upper door 20, and the lower link module 800 can be coupled to a top surface of the lower door 30.

The upper link module 700 and the lower link module 800 can be vertically disposed to be spaced apart from each other in an inner region of the hinge bracket 61. That is, spaces that are spaced apart from each other in a vertical direction can be provided in the upper link module 700 and the lower link module 800, respectively. Thus, even if the upper link module 700 droops or is deformed downward by a load of the upper door 20, the upper link module 700 can be prevented from interfering with the lower link module 800 in a trajectory.

The vertical width of the hinge bracket 61 can be determined according to the vertical width of the barrier 11. The barrier 11 can be designed to have a thickness at which the upper storage space 12 and the lower storage space 13 are partitioned in an adiabatic state. And, as a vertical width of the hinge bracket 61 is minimized, a thickness of the barrier 11 can also be reduced. Thus, storage capacity of each of the upper storage space 12 and the lower storage space 13 can be secured. As described above, the vertical width of the link hinge 600 within a range that allows the normal opening and closing operation of the upper door 20 and the lower door 30 can be minimized.

The hinge bracket 61 can have a plate shape made of a metal material, and a plurality of plate shapes can be connected in a direction crossing each other to support the upper link module 700 and the lower link module 800.

That is, the hinge bracket 61 can include a base portion 6110 fixed in contact with the cabinet 10 and a support portion 6140 extending in a vertical direction from one side of the base portion 6110.

A plurality of coupling holes 6120 can be defined in the base portion 6110. A coupling member such as a screw can be inserted into the plurality of connection holes 6130 so that the hinge bracket 61 is fixed and mounted on the front surface of the cabinet 10.

The support portion 6140 can extend forward from a front surface of the base portion 6110. The support portion 6140 can extend from both side ends of the base portion 6110 at a side end that is close to a rotation axis at which the link hinge 600 rotates. In some examples, the support portion 6140 can extend from a central portion of the base portion 6110, and the upper link module 700 can be disposed above the central portion of the base portion 6110, and the lower link module 800 can be disposed under the central portion of the base portion 6110.

In some examples, the support portion 6140 can include a plurality of holes connected to the plurality of links. In detail, a main support portion hole 6150 and a sub support hole 6160, in which a main rotation shaft 620 and a sub rotation shaft 630, which pass through the support portion 6140, are mounted, respectively.

In some examples, the main support portion hole 6150 can be defined in an outer end of the support portion 6140, and the sub support hole 6160 can be defined further inside (a direction closer to the center of the support portion).

In some examples, the support portion 6140 can include a connection hole 6130 through which the coupling member 6130*a* passes to be coupled to a shielding portion 6170 to be described later. The connection hole 6130 can be defined at a position corresponding to the through-hole 6190. In detail, the connection hole 6130 can be defined at one side of the rear end of the support portion 6140.

In some examples, a shielding portion 6170 can be provided to define a portion of a side surface when the link hinge 600 is fully folded at one side of the hinge bracket 61, The shielding portion 6170 can have a rectangular plate shape and be disposed in a direction crossing the support portion 6140. In some examples, the shielding portion 6170 can include a protruding portion 6180 including a through-hole 6190 defined so that the coupling member passes to be coupled to the support portion 6140. A plurality of protrusions 6180 can be disposed at a rear end of the shielding portion 6170 to protrude toward the support portion 6140 and can be spaced apart from each other in the vertical direction.

In some examples, the support portion 6140 can be connected by passing through the coupling member such as a screw while one end is inserted into the spaced space of the protruding portion 6180.

The shielding portion 6170 can be connected to one end of the support portion 6140 to shield one side of the upper link module 700 and the lower link module 800 while the link hinge 600 rotates.

The upper link module 700 and the lower link module 800 can be exposed to the outside by the opening and closing operation of the upper door 20 or the lower door 30, and thus, foreign substances can be introduced into the link hinge 600, or the user's fingers or body can be caught. The shielding portion 6170 can shield one side of the link hinge 600 while the upper door 20 or the lower door 30 rotates to prevent the above-described limitation from occurring.

In some examples, the upper link module 700 and the lower link module 800 can be disposed vertically and be penetrated by the main rotation shaft 620 and the sub rotation shaft 630 to rotate independently.

The upper link module 700 and the lower link module 800 can be partitioned by the support portion 6140 and disposed vertically and spaced apart from each other. Thus, the upper link module 700 and the lower link module 800 may not be restricted by being caught by each other in the process of rotating.

The upper link module 700 can include the upper main link 71, the upper connection link 720, a first upper sub link 730, a second upper sub link 740, and an upper door bracket 750.

In some examples, the lower link module 800 can include the lower main link 810, the lower connection link 820, a first lower sub link 830, a second lower sub link 840, and a lower door bracket 850.

Figure 27:
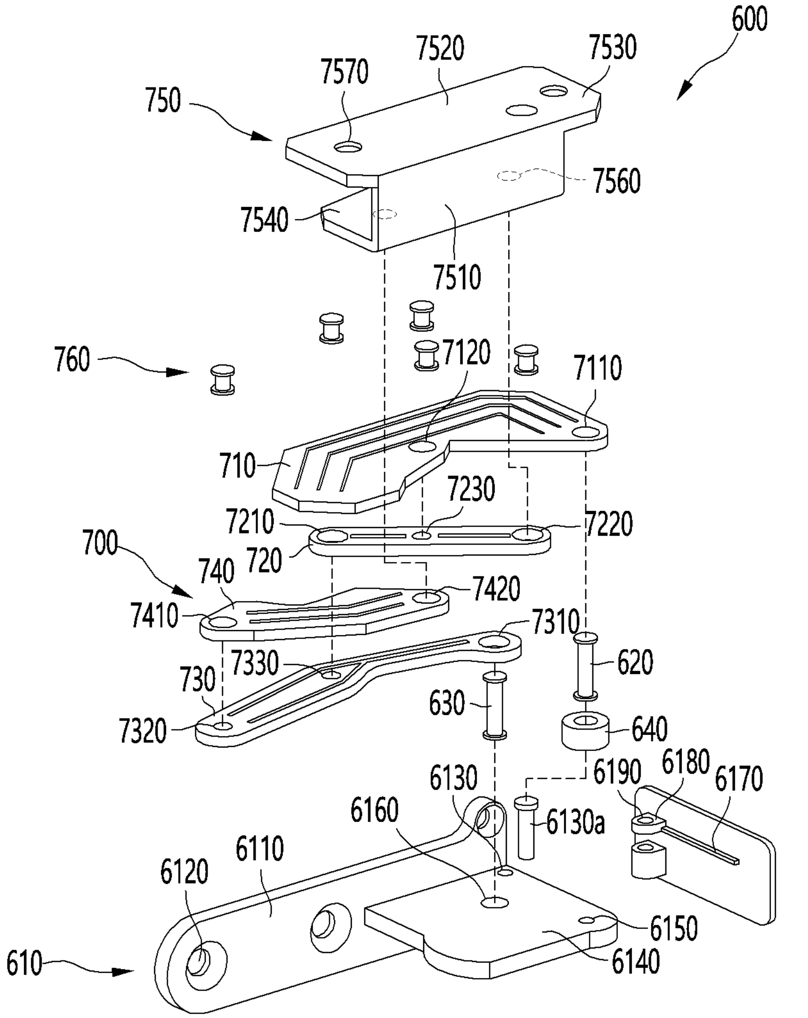
FIG. 27 is an exploded perspective view illustrating an example of an upper link module of the link hinge in FIG. 23.

FIG. 27 is an exploded perspective view illustrating an example of the upper link module of the link hinge in FIG. 23.

Referring to the drawings, the upper link module 700 can have the same planar shape as the lower link module 800 as a whole and can have the same structure and shape as the lower link module 800 when viewed from an upper side even in the state of being folded or unfolded.

The upper link module 700 can have a structure in which the first upper sub link 730 and the second upper sub link 740 are rotatably connected to each other between the upper main link 71 and the upper door bracket 750. In some examples, the upper link module 700 can further include the upper connection link 720 connecting the second upper sub link 740 to the upper door bracket 750.

In addition, the upper main link 71, the first upper sub link 730, the second upper sub link 740, and the upper connection link 720 can be made of a plate-shaped metal material and also can have shapes that do not interfere with each other.

An upper main hole 7110 through which the main rotation shaft 620 passes can be defined in one end of the upper main link 71. In some examples, a spacer 640 can be further provided under the upper main hole 7110. The spacer 640 maintains a state in which the upper main link 71 is spaced apart from the support portion 6140 of the hinge bracket 61 while the main rotation shaft 620 passes through the upper main hole 7110.

In some examples, a main shaft hole 7120 to which the upper connection link 720 is axially coupled can be defined in the upper main link 71. The upper shaft 760 can pass through the main shaft hole 7120 and can be rotatably coupled to the upper connection link 720.

When the upper link module 700 is fully folded (the upper door is closed), the upper main link 71 can have a rear end that is close to the base portion 6110 in a shape close to a straight line. In some examples, the upper main link 71 can have a shape in which a central portion of the upper main link 71 is recessed backward.

The upper connection link 720 can have one end connected to the first upper sub link 730 and the other end rotatably connected to the upper door bracket 750. That is, the upper connection link 720 can have one end in which a first connection shaft hole 7210 connecting the first upper sub link 730 is defined and the other end in which a second connection shaft hole 7220 connecting the upper door bracket 750 is defined. The upper shaft 760 can pass through the first and second connection shaft holes 7210 and 7220, and can be rotatably coupled to the first and second connection shaft holes 7210 and 7220.

In some examples, the upper connection link 720 can include a third connection shaft hole 7230 at a central portion and can be connected to the upper main link 71. The upper connection link 720 can support the upper main link 71 from the lower side and connect the first upper sub link 730 to the upper main link 71 to enable rotation.

The first upper sub link 730 can be provided as a metal plate shape and can be axially coupled to an end of the upper connection link 720 by the upper shaft 760. In some examples, one end of the first upper sub link 730 can be connected to a sub rotation shaft 630 passing through the sub support hole 6160. In some examples, the other end of the first upper sub link 730 can be axially coupled to one end of each of the second upper sub link 740 and the upper shaft 760.

That is, an upper sub hole 7310 through which the sub rotation shaft 630 passes can be defined in one end of the first upper sub link 730.

In some examples, the first upper sub link 730 can have a shaft hole 7320 axially coupled to the other end by an upper shaft 760, and a shaft hole 7330 axially coupled to one end of the upper connection link 720 be defined in the central portion of the first upper sub link 730.

In some examples, when the upper link module 700 is fully folded, the first upper sub link 730 can have a width (length in a front and rear direction) of a portion thereof connected to the support portion 6140, which is less than that of a portion thereof connected to the second upper sub link 740 based on the central part. In the process of rotating with this structure, an interference with other components can be reduced.

The second upper sub link 740 can have a plate shape made of a metal material and can include shaft holes 7410 and 7420, through which the upper shaft 760 passes, at both side ends.

In some examples, one end of the second upper sub link 740 can be rotatably mounted by the first upper sub link 730 and the upper shaft 760. In some examples, the second upper sub link 740 can be disposed above the first upper sub link 730. In some examples, the second upper sub link 740 can be rotatably mounted at the other end by the upper door bracket 750 and the upper shaft 760.

That is, when the upper door 20 is fully opened, the second upper sub link 740 can be disposed between the upper main link 71 and the first upper sub link 730 and be connected to the first upper sub link 730 from the hinge bracket 61 to the upper door bracket 750.

In some examples, an end of the second upper sub link 740 can be connected to the upper door bracket 750. The upper door bracket 750 can be connected to a top surface of the upper door 20 to connect the upper link module 700 to the upper door 20.

When the link hinge 600 is fully unfolded (when the upper door is opened), one end of the upper main link 71 can be connected to the main rotation shaft 620, and the other end of the upper main link 71 can be accommodated inside the upper door bracket 750.

In some examples, the first upper sub link 730 and the second upper sub link 740 can be disposed under the upper main link 71. One end of the first upper sub link 730 can be connected to the sub support hole 6160 passing through the sub rotation shaft 630, and the other end of the first upper sub link 730 can be connected to one end of the second upper sub link 740.

One end of the second upper sub link 740 can be connected to the first upper sub link 730, and the second upper sub link 740 can be connected to the upper door bracket 750.

In some examples, the upper connection link 720 can be disposed between the upper main link 71 and the first and second upper sub links 740, one end can be connected to the first upper sub link 730, and the other end can be connected to the upper door bracket 750. In some examples, the upper connection link 720 can be connected to the upper main link 71.

The upper door bracket 750 can include a plate portion 7510 shielding the upper link module 700 at the front side, and a side portion 7520 that is bent and extends backward from each of upper and lower ends of the plate portion 7510. In some examples, the upper door bracket 750 can define a space that accommodates the upper link module 700 in a space between the side portions 7520.

The side portions 7520 can include an upper side portion 7530 vertically bent and extending from the upper end of the plate portion 7510 and a lower side portion 7540 vertically bent and extending from the lower end of the plate portion 7510.

The upper side portion 7530 can be provided with a plurality of coupling holes 7570 through which a coupling member passes to be coupled to a bottom surface of the upper door 20.

The lower side portion 7540 can have a plurality of lower side holes 7560 passing through the lower shaft 860 so that the second lower sub link 840 and the upper connecting link 720 are rotatably connected to each other.

In some examples, the lower side portion 7540 can include a tilted portion 7550 of which a rear end is tilted forward so that the upper link module 700 may not interfere with the lower side portion 7540 while the upper link module 700 rotates.

Hereinafter, the structure of the lower link module 800 will be described in detail.

Figure 28:
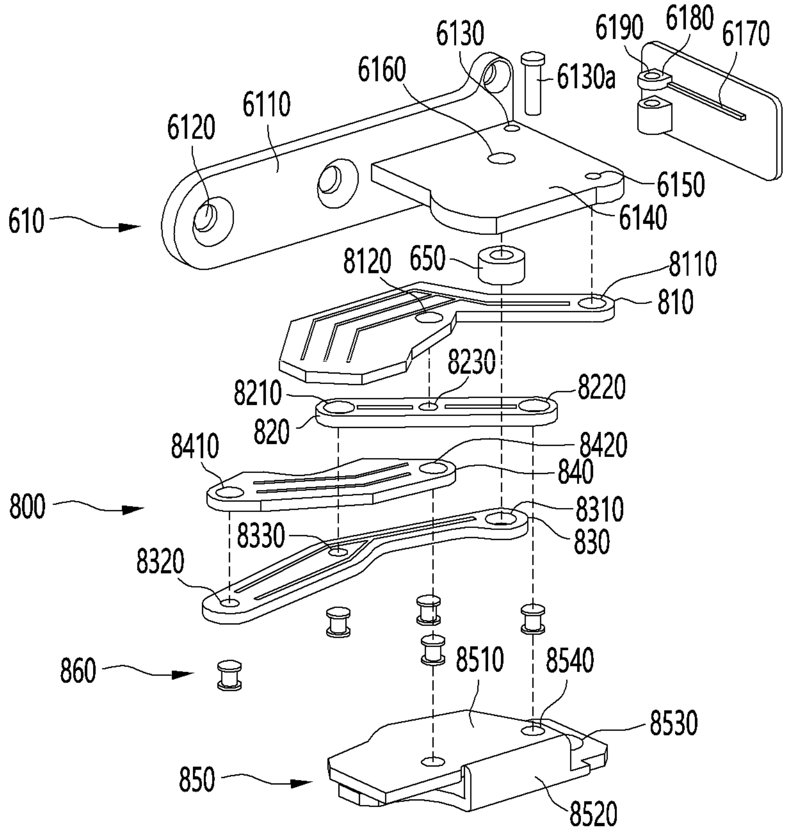
FIG. 28 is an exploded perspective view illustrating an example of a lower link module of the link hinge in FIG. 23.
Figure 29:
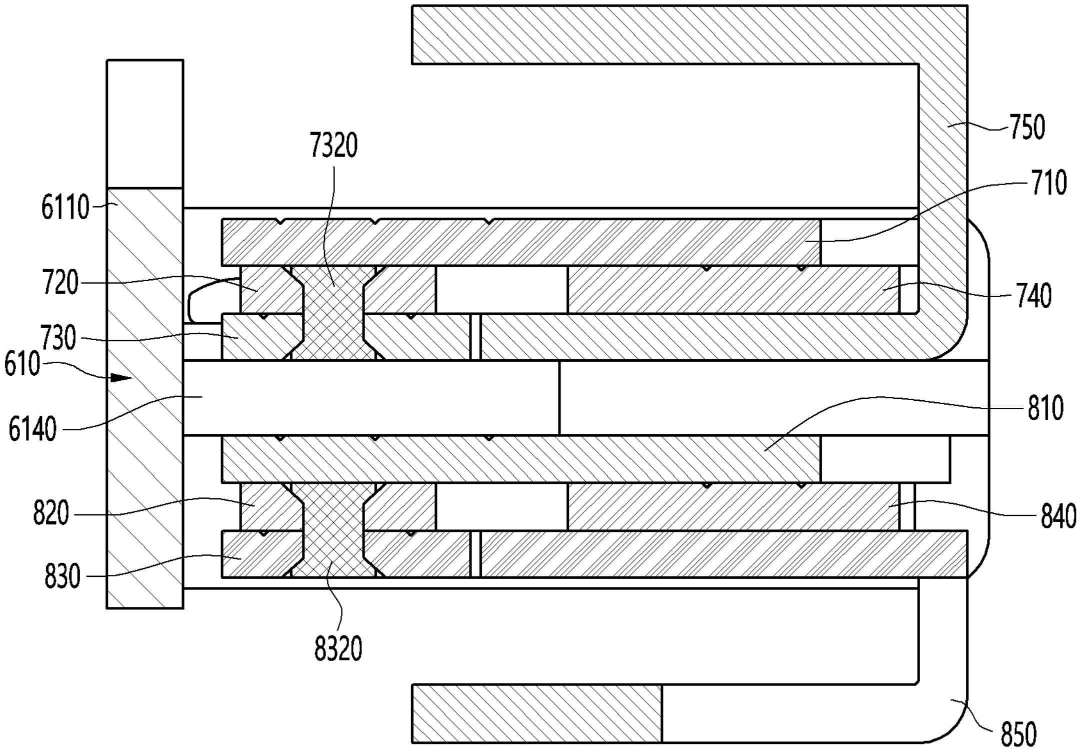
FIG. 29 is a cross-sectional view taken along line XXIX-XXIX' of FIG. 24.

FIG. 28 is an exploded perspective view illustrating an example of a lower link module of the link hinge in FIG. 23. In some examples, FIG. 29 is a cross-sectional view taken along line XXIX-XXIX' of FIG. 24.

The lower link module 800 can have the same structure and shape as the upper link module 700.

The lower link module 800 can include the lower main link 810, the first lower sub link 831, a second lower sub link 840, and a lower door bracket 850. In some examples, the lower link module 800 can further include a lower connection link 820 connecting the first lower sub link 830 to the lower door bracket 850.

A lower main hole 8110 through which the lower main rotation shaft 620 passes can be defined in one end the lower main link 810. In some examples, a lower spacer 650 can be further provided under the lower main hole 8110. The lower spacer 650 maintains a state in which the lower main link 810 is spaced apart from the support portion 6140 of the hinge bracket 61 while the lower main rotation shaft 620 passes through the lower main hole 8110.

In some examples, a lower main shaft hole 8120 to which the lower connection link 820 is axially coupled can be defined in the lower main link 810. The lower shaft 860 can pass through the lower main shaft hole 8120 and can be rotatably coupled to the lower connection link 820.

When the lower link module 800 is fully folded (the upper door is closed), the lower main link 810 can have a rear end that is close to the base portion 6110 in a shape close to a straight line. In some examples, the lower main link 810 can have a shape in which a central portion of the upper main link 71 is recessed backward.

In some examples, the lower main link 810 can have a smaller width (length in the front and rear direction) in a direction closer to the lower main rotation shaft 620 than the upper main link 71 based on a relatively central portion.

The lower connection link 820 can have the same shape as the upper connection link 720. In some examples, one end of the lower connection link 820 can be connected to the first lower sub link 830, and the other end can be rotatably connected to the lower door bracket 850.

In some examples, the lower connection link 820 can be rotatably connected to the lower main link 810. That is, the lower connection link 820 can have one end in which a first connection shaft hole 8210 connecting the first lower sub link 830 is defined and the other end in which a second connection shaft hole 8220 connecting the lower door bracket 850 is defined. In some examples, the lower connection link 820 can include a third connection shaft hole 8230 at a central portion and can be connected to the lower main link 810.

The first lower sub link 830 can have the same shape as the first upper sub link 730. That is, a lower sub hole 8310 through which the sub rotation shaft 630 passes can be defined in one end of the first lower sub link 830.

In some examples, the first lower sub link 830 can have a shaft hole 8320 axially coupled to the other end by a lower shaft 860, and a shaft hole 8330 axially coupled to one end of the upper connection link 720 be defined in the central portion of the first lower sub link 830.

In some examples, one end of the first lower sub link 830 can be connected to the sub rotation shaft 630, and the other end can be connected to one end of the second lower sub link 840.

The second lower sub link 840 can have the same shape as the second upper sub link 740. The second lower sub link 840 can have a plate shape made of a metal material and can include shaft holes 8410 and 8420, through which the lower shaft 860 passes, at both side ends.

One end of the second lower sub link 840 can be rotatably mounted on one end by the first lower sub link 830 and the lower shaft 860. In some examples, the other end of the second lower sub link 840 can be rotatably connected to the lower door bracket 850.

In some examples, the lower link module 800 includes a lower door bracket 850 coupled to the top surface of the lower door 30.

The lower door bracket 850 can be fixed to the top surface of the lower door 30 while supporting the first lower sub link 830 and the second lower sub link 840 from the lower side.

The lower door bracket 850 can have a plurality of lower coupling holes 8530 passing through the coupling member so as to be fixed to the top surface of the lower door 30. The lower door bracket 850 can have a shape in which a plurality of plates overlap each other.

In some examples, the lower door bracket 850 can include a lower plate portion 8510 supporting the lower link module 800 from the lower side and an extension portion 8520 extending upward from a front end of the lower plate portion 8510.

In some examples, a shaft hole 8540 capable of being axially coupled to the second lower sub link 840 can be defined in a top surface of the lower plate portion 7510.

In the link hinge, when both the upper door 20 and the lower door 30 are closed, the link hinge 600 is in a compact state such as a substantially hexahedral shape. In this state, the space occupied by the link hinge 600 can be minimized, and the link hinge 600 can be effectively disposed in a narrow space between the upper door 20 and the lower door 30.

In detail, the upper link module 700 and the lower link module 800 are disposed in an inner region of the hinge bracket 61 in the fully folded state.

When the user opens the upper door 20 or the lower door 30 in this state, the upper door 20 and the lower door 30 start to rotate, and the link hinge 600 operates.

When the upper door 20 and the lower door 30 rotate, the upper hinge 40 connected to the upper end of the upper door 20 and the lower hinge 50 connected to the lower end of the lower door 30 can rotate along the same trajectory as the link hinge 600. Particularly, each of the upper door 20 and the lower door 30 can rotate at an angle of about 120 degrees or more and about 130 degrees about a rotation axis without an interference with other furniture or walls disposed adjacent to each other.

In some examples, each of both the lower link module 800 and the upper link module 700 can have a plate shape, and thus, a thickness of the link hinge 600 can be slimmed in the entire vertical direction. Thus, a thickness of the barrier 11 can be thinner, and an interval between an upper door 20 and a lower door 30 can be narrower to improve an outer appearance.

Hereinafter, another implementation will be described in more detail with reference to the drawings.

Another implementation is different only in structure of the cabinet and the door, configurations of the link hinge can be the same as the forgoing implementations. Thus, the same components are denoted using the same reference numerals or detailed descriptions thereof will be omitted to prevent duplication of description.

Figure 30:
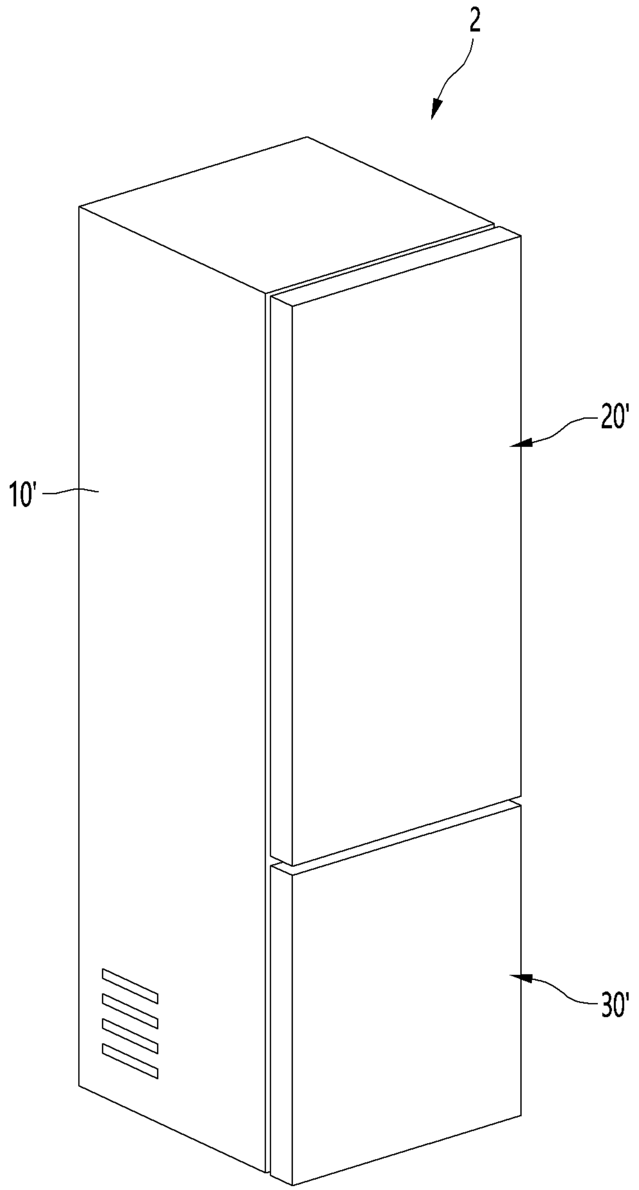
FIG. 30 is a perspective view illustrating an example of a refrigerator.
Figure 31:
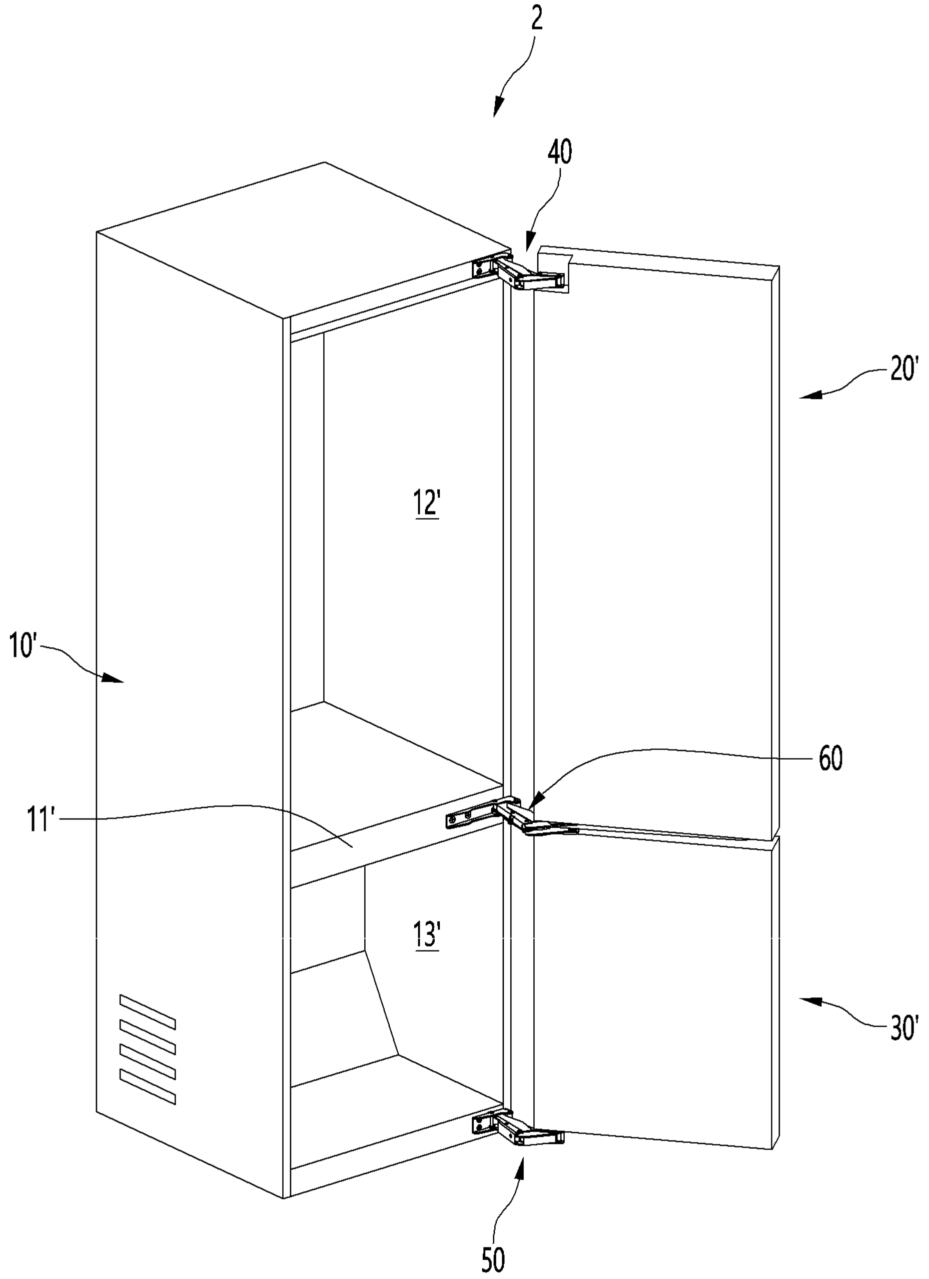
FIG. 31 is a perspective view illustrating an example of an upper door and a lower door of the refrigerator that are opened.

FIG. 30 is a perspective view an example of a refrigerator. In some examples, FIG. 31 is a perspective view illustrating a state in which an upper door and a lower door of the refrigerator are opened.

As illustrated in the drawing, a refrigerator 1' can include a cabinet 10' in which a storage space is defined, and doors 20' and 30' that open and close the storage space.

The storage space within the cabinet 10' can be vertically partitioned by a barrier 11' to provide a refrigerating compartment 12' at an upper side and a freezing compartment 13' at a lower side. In some examples, the doors 20' and 30' can include a refrigerating compartment door 20' and a freezing compartment door 30', which open and close the refrigerating compartment 12' and the freezing compartment 13', respectively, and the refrigerating compartment door 20' and the freezing compartment door 30' can be rotatably mounted to the cabinet 10'.

In some examples, an upper hinge 40, a lower hinge 50, and a link hinge 60 can be provided on a front surface of the cabinet 10'. A structure of each of the upper hinge 40, the lower hinge 50, and the link hinge 60 is the same as that according to the foregoing implementations, and thus detailed descriptions thereof will be omitted.

The refrigerator 1' can be disposed to be embedded in furniture or a wall, or a plurality of refrigerators 1' can be disposed side by side or disposed side by side with other home appliances. In this case, since the periphery of the door 20' and 30' are disposed very close to the furniture or the wall, other refrigerators, or home appliances, an interval therebetween can be substantially narrowed.

In this state, the refrigerating compartment door 20' and the freezing compartment door 30' can rotate so as not to interfere with the adjacent furniture or walls, other refrigerators, or the home appliances. In some examples, the upper hinge 40, the lower hinge 50, and the link hinge 60 can be configured as a combination of a plurality of links, and while the upper hinge 40, the lower hinge 50, and the link operate, the door can be configured to rotate along a set trajectory that does not interfere with the furniture or wall, other refrigerators, or home appliances.

Particularly, the link hinge 60 can be mounted on the barrier 11' to independently support the refrigerating compartment door 20' and the freezing compartment door 30', and the refrigerating compartment door 20' and the freezing compartment door 30' can rotate by the link hinge 60.

In some examples, the link hinge 60 can be mounted on the barrier 11' having a narrow vertical width, and in particular, can have a compact structure and thus have a mounting structure in which a distance between a lower end of the refrigerating compartment door 20' and an upper end of the freezing compartment door 30' is minimized.

The link hinge 60 can use the link hinges 60 and 60" in some examples and can have a structure including the upper link modules 70 and 80' and the lower link module 80.

Therefore, even when a weight of the door 20' shielding the refrigerating compartment 12' and the freezing compartment 13' is heavy, the door 20' and the upper link modules 70 and 80' can be prevented from excessively drooping. In some examples, even if the door 20' and the upper link modules 70 and 80' droop during the opening of the door 20', the smooth opening and closing operation of the door 20' can be realized by supporting the upper link modules 70 and 80' using the supporter 86 and by allowing the upper link modules 70 and 80' to smoothly and relatively move.

The present disclosure has been described as an example in the case the multi-joint link hinge is applied to the refrigerator, but the same principle can be applied to other home appliances including a hinge device that connects the cabinet to the door. For example, the multi-joint link hinge can be applied to a washing machine, a microwave oven, a plant cultivation apparatus, a clothes processing apparatus, and the like.

The link hinge and the refrigerator including the link hinge can have the following effects.

In some implementations, the link hinge can have the structure in which an upper link module rotatably connecting the upper door to one hinge bracket and the lower link module rotatably connecting the lower door to one hinge bracket are coupled to each other. Particularly, the upper link module and the lower link module can be configured by coupling the plurality of links to allow the user to more easily open and close the door because the rotation of the doors do not interfere with the furniture, the walls, or the home appliances while the upper door and the lower door rotate to be opened and closed.

In addition, the upper link module and the lower link module, which constitute the link hinge can be constituted by the plurality of plate-shaped links and be disposed in the inner region of the hinge bracket to minimize the vertical width, i.e., the thickness of the link hinge. Therefore, the width of the space in which the link hinge is mounted can be minimized, and the interval between the upper door and the lower door can be minimized so that the front outer appearance of the refrigerator is viewed very neatly.

In addition, the thickness of the link hinge can be thinner by minimizing the interval between the upper link module and the lower link module, and the front outer appearance of the refrigerator can be more improved by reducing the interval between the upper and lower doors.

In addition, due to the structural characteristics of the refrigerator door having the heavy weight and the structural characteristics of the upper link module having the plurality of link structures, the downward drooping of the upper door and the upper link module can inevitably occur during the opening and closing operation of the upper door, but the upper link module can be supported from the lower side by the supporter to prevent or reduce drooping of the upper link module and the upper door.

In addition, the supporter can be disposed between the upper link module and the lower link module to avoid the interference between the upper link module and the lower link module even if the interval between the upper link module and the lower link module is minimized, and the upper link module can be in contact with the supporter to perform the smoother rotation operation.

That is, when the supporter is in contact with the upper link module, the upper link module can be prevented from drooping downward, and the supporter can allow the upper link module to be remained in contact with the upper link module to secure the operation of the upper link even if the interval between the upper link module and the lower link module is minimized.

In addition, the supporter can be made of the metal material to avoid the interference between the upper link module and the lower link module, and thus, the strength of each of the upper link module and the lower link module, which are made of the metal material, can be secured.

In addition, since the supporter is made of the material having the excellent wear resistance and lubrication performance, when being in contact with the upper link module, the movement operation of the upper link module can be smoothly performed.

In addition, the supporter can ensure the smoother operation at the start and end of the contact with the upper link module by the front guide portion and the rear guide portion. In addition, the supporting ball can be provided on the supporter, and the supporting ball can be in contact with the upper link module so that the upper link module operates more smoothly.

Particularly, the upper link module can be prevented from drooping downward by the supporter, and the components such as the heavy dispenser and the ice maker can be disposed on the upper door, and the door basket for storing food can be disposed.

In addition, even if the front outer appearance of the door is made of heavy tempered glass, steel, or a tile material, the door and the upper link module can be prevented from excessively dropping, and the smooth opening and closing operation of the door can be secured.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:

a cabinet that defines an upper storage space and a lower storage space disposed vertically below the upper storage space;

a barrier that partitions the upper storage space and the lower storage space from each other;

an upper door configured to rotate relative to the cabinet and to open and close the upper storage space;

a lower door configured to rotate relative to the cabinet and to open and close the lower storage space;

a hinge bracket fixed to a front surface of the barrier;

an upper link module coupled to the hinge bracket along a rotation axis of the upper door and configured to rotate the upper door relative to the cabinet, the upper link module being fixed to a bottom surface of the upper door;

a lower link module coupled to the hinge bracket along a rotation axis of the lower door and configured to rotate the lower door relative to the cabinet, the lower link module being fixed to a top surface of the lower door; and a supporter that is disposed between the upper link module and the lower link module, the supporter being configured to be in contact with the upper link module or the lower link module based on operation of the upper link module or the lower link module, wherein the supporter has a plate shape, the supporter comprising:

a front guide portion disposed at a front end of the supporter, wherein a height of the front guide portion decreases toward the front end of the supporter, and a rear guide portion disposed at a rear end of the supporter, wherein a height of the rear guide portion decreases toward the rear end of the supporter.

2. The refrigerator according to claim 1, wherein the supporter is disposed vertically above the lower link module and configured to support the upper link module in a state in which the lower door is closed.

3. The refrigerator according to claim 2, further comprising a supporting ball disposed at the supporter and configured to roll relative to the upper link module and the lower link module, wherein at least a portion of the supporting ball is exposed to an outside of the supporter and in contact with the upper link module and the lower link module.

4. The refrigerator according to claim 1, wherein the hinge bracket comprises:

a base portion that defines a plurality of screw coupling holes at a vertical surface of the base portion; and a support portion that protrudes from the vertical surface and extends in a horizontal direction.

5. The refrigerator according to claim 1, wherein the hinge bracket comprises:

a base portion that defines a plurality of screw coupling holes at a vertical surface of the base portion, and a plurality of side portions that extend from the base portion in a horizontal direction and are spaced apart from each other in a vertical direction.

6. The refrigerator according to claim 5, wherein the upper link module comprises a plurality of upper plate-shaped links, and the lower link module comprises a plurality of lower plate-shaped links, and wherein the plurality of upper plate-shaped links and the plurality of lower plate-shaped links are disposed between the plurality of side portions and coupled to the plurality of side portions along an axis that extends in the vertical direction in which the vertical surface of the base portion extends.

7. The refrigerator according to claim 1, wherein the supporter further comprises an intermediate portion disposed between the front guide portion and the rear guide portion, the intermediate portion having a constant height.

8. The refrigerator according to claim 1, further comprising:

a supporting ball disposed at the supporter and configured to roll relative to the upper link module and the lower link module, wherein at least a portion of the supporting ball is exposed to an outside of the supporter and in contact with the upper link module and the lower link module.

9. The refrigerator according to claim 1, wherein each of the upper link module and the lower link module is made of a metal material, and wherein the supporter is made of a polyoxymethylene (POM) material.

10. The refrigerator according to claim 1, further comprising:

a spacer that is disposed inside the hinge bracket and penetrated by a rotation shaft, the spacer maintaining a fixed interval between the upper link module and the lower link module.

11. The refrigerator according to claim 1, wherein the lower link module comprises a lower door bracket and a plurality of lower plate-shaped links, the plurality of lower plate-shaped links comprising:

a lower main link that is coupled to the hinge bracket and faces a bottom surface of the upper link module;

a first lower sub link that is coupled to each of a first side of the lower main link and a first side of the lower door bracket;

a second lower sub link that is coupled to each of a second side of the lower main link and a second side of the lower door bracket; and a lower connection link that is coupled to the first side of the lower main link and the second lower sub link.

12. The refrigerator according to claim 11, wherein the lower main link defines a supporter mounting portion that is recessed from a top surface of the lower main link and supports the supporter, the supporter mounting portion having a shape corresponding to the supporter.

13. The refrigerator according to claim 1, wherein the upper link module comprises:

a plurality of upper plate-shaped links that are coupled to the hinge bracket along the rotation axis of the upper door and configured to rotate the upper door relative to the cabinet; and an upper door bracket comprising a plate-shaped upper plate that is coupled to at least one of the plurality of upper plate-shaped links and the bottom surface of the upper door.

14. The refrigerator according to claim 1, wherein the lower link module comprises:

a plurality of lower plate-shaped links that are coupled to the hinge bracket along the rotation axis of the lower door and configured to rotate the lower door relative to the cabinet; and a lower door bracket comprising a plate-shaped lower plate that is coupled to at least one of the plurality of lower plate-shaped links and the top surface of the lower door.

* * * * *